United States Patent
Kolze

(10) Patent No.: US 8,094,676 B2
(45) Date of Patent: Jan. 10, 2012

(54) FLEXIBLE UPSTREAM PHY BURST PROFILE PARAMETERS TO IMPROVE PERFORMANCE OF SHORT BURSTS IN IMPULSE NOISE

(75) Inventor: Thomas J Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/710,017

(22) Filed: Feb. 22, 2010

(65) Prior Publication Data
US 2010/0142553 A1    Jun. 10, 2010

Related U.S. Application Data

(63) Continuation of application No. 09/737,276, filed on Dec. 13, 2000, now Pat. No. 7,675,938.

(60) Provisional application No. 60/170,593, filed on Dec. 13, 1999.

(51) Int. Cl.
*H04J 3/00* (2006.01)
(52) U.S. Cl. ..................................... 370/464
(58) Field of Classification Search .................. 370/464, 370/473, 478, 485, 498, 503, 508–513; 375/354–356; 725/111, 121–122, 125–126
See application file for complete search history.

(56) References Cited

U.S. PATENT DOCUMENTS

| 5,790,806 A | 8/1998 | Koperda |
| 6,230,326 B1 | 5/2001 | Unger et al. |
| 6,236,678 B1 | 5/2001 | Horton et al. |
| 6,285,681 B1 | 9/2001 | Kolze et al. |
| 6,453,472 B1 | 9/2002 | Leano et al. |
| 6,606,352 B2 | 8/2003 | Horton et al. |
| 6,650,624 B1 | 11/2003 | Quigley et al. |
| 6,742,186 B1 | 5/2004 | Roeck |
| 6,961,314 B1* | 11/2005 | Quigley et al. ............... 370/252 |
| 6,965,616 B1* | 11/2005 | Quigley et al. ............... 370/480 |
| 7,017,176 B1 | 3/2006 | Lee et al. |
| 7,103,065 B1* | 9/2006 | Quigley et al. ............... 370/465 |

FOREIGN PATENT DOCUMENTS

WO    WO 9735410 A    9/1997

OTHER PUBLICATIONS

SP-RFI-I04-980724, Data-Over-Cable Service Interface Specifications Radio Frequency Interface Specification, Interim Specification, Cable Television Laboratories, Inc., 208 pages, Jul. 24, 1998.*
International Search Report for Application No. PCT/US 00/42827 mailed May 11, 2001, seven (7) pages.

(Continued)

*Primary Examiner* — Frank Duong
(74) *Attorney, Agent, or Firm* — Sterne, Kessler, Goldstein and Fox P.L.L.C.

(57) ABSTRACT

A single carrier cable modem can be initialized on multiple channels. By initializing a cable modem on more than one channel, the error rate performance of short data packets in cable modems in an impulsive noise environment is improved. The advantage of low symbol rate transmission for short packets in an impulse noise environment is achieved without sacrificing burst capacity at a cable modem and without the complexity of transmitting multiple symbol waveforms simultaneously at a cable modem.

35 Claims, 18 Drawing Sheets

OTHER PUBLICATIONS

Cable Television Laboratories, Inc., "Superseded, Data-Over-Cable Service Interface Specifications, Radio Frequency Interface Specification, Interim Specification," SP-RFIv1.1-I03-991105 (1999), 382 pages.

Cable Television Laboratories, Inc., "Data-Over-Cable Service Interface Specifications, Radio Frequency Interface Specification, SP-RFIv1.I03-991105," pp. 147-154 (1999).

Cable Television Laboratories, Inc., "Data-Over-Cable Service Interface Specifications, Burst Profiles, SP-RFIv1.I03-991105," Section 4.2.7, pp. 27-30 (1999).

Cable Television Laboratories, Inc., "Data-Over-Cable Service Interface Specifications, Registration Request (REG-REQ), SP-RFIv1.I03-991105," Section 6.3.7, p. 86 (1999).

Cable Television Laboratories, Inc., "Data-Over-Cable Service Interface Specifications, Ranging, SP-RFIv1.I03-991105," Section 7.3.3, p. 115 (1999).

Cable Television Laboratories, Inc., "Data-Over-Cable Service Interface Specifications, Cable Modem -CMTS Interaction, SP-RFIv1.I03-991105," Sections 9.1-9.2.10, pp. 155-171 (1999).

Cable Television Laboratories, Inc., "Data-Over-Cable Service Interface Specifications, Vendor-Specific Information, SP-RFIv1.I03-991105," Section C.1.1.17, p. 230 (1999).

Cable Television Laboratories, Inc., "Data-Over-Cable Service Interface Specifications, SP- RFIv1.I03-991105," Sections C.1.3-C.1.3.4, pp. 233-236 (1999).

Kolze, T., "Upstream HFC Channel Modeling and Physical Layer Design," General Instrument Corporation, XP-000925028.

International Preliminary Examination Report dated Jul. 17, 2002 from corresponding PCT Application No. PCT/US00/42827.

Written Opinion dated May 21, 2002 from corresponding PCT Application No. PCT/US00/42827.

Sdralia et al., "Performance Characterisation of the MCNS DOCSIS 1.0 CATV Protocol With Prioritised First Come First Served Scheduling," IEEE Transactions on Broadcasting, vol. 45, No. 2, Jun. 1999, pp. 196-205.

* cited by examiner

FLEXIBLE UPSTREAM PHY BURST PROFILE PARAMETERS TO IMPROVE PERFORMANCE OF SHORT BURSTS IN IMPULSE NOISE

CROSS REFERENCE TO RELATED APPLICATIONS

This application is a continuation of U.S. application Ser. No. 09/737,276, filed Dec. 13, 2000, now U.S. Pat. No. 7,675,938, which claims the benefit of U.S. Provisional Patent Application No. 60/170,593, filed Dec. 13, 1999, which is incorporated herein by reference in its entirety.

BACKGROUND OF THE INVENTION

1. Field of the Invention

The present invention relates generally to communication systems. The present invention relates more particularly to a cable modem system wherein information is communicated between a plurality of cable modems and a cable modem termination system. It applies to any environment which has single carrier modulation which shares time and frequency among multiple users.

2. Background Art

The desired solution for high speed data communications appears to be cable modem. Cable modem is capable of providing data rates as high as 56 Mbps, and is thus suitable for high speed file transfer, video teleconferencing and pay-per-view television. Further, cable modems may simultaneously provide high speed Internet access, digital television (such as pay-per-view) and digital telephony.

Although cable modems are used in a shared access system, wherein a plurality of subscribers compete for upstream bandwidth over a common coaxial cable, any undesirable reduction in actual data rate is easily controlled simply by limiting the number of shared users on each system. In this manner, each user is assured of a sufficient data rate to provide uninterrupted video teleconferencing or pay-per-view television, for example.

Data Over Cable Service Interface Specification (DOCSIS) Discussion

The DOCSIS specification defines the radio-frequency interface specifications for high-speed data-over-cable systems developed by Cable Television Laboratories for the cable industry. It is used to facilitate the design of interoperable hardware by multiple vendors. As stated above, the DOCSIS Specification (Versions 1.0 and 1.1) is incorporated fully herein by reference in its entirety. In particular, the Data-Over-Cable Service Interface Specifications, Radio Frequency Interface Specification, SP-RFIv1.1-I03-991105, Interim Specification, Nov. 5, 1999 ("DOCSIS") will be referred to by section number elsewhere herein (e.g., "DOCSIS Section 4.2.7"). This summary of some sections of the DOCSIS specification provides background information to aid the reader in understanding certain embodiments of the present invention.

Cable Modem Initialization

In general, before a DOCSIS compliant cable modem (CM) may transmit upstream, it must be initialized. Initialization of a CM may be divided into the following phases: (1) Scan for downstream channel and establish synchronization with the Cable Modem Termination System (CMTS); (2) Obtain transmit parameters (from UCD message); (3) Perform ranging; (4) Establish IP connectivity; (5) Establish time of day; (6) Transfer operational parameters; (7) Perform registration; and (8) Baseline Privacy initialization (if so provisioned). (See DOCSIS sections 7.3.3; 9.2.-9.2.9.) These steps are described in detail elsewhere herein and illustrated in FIG. 9, blocks 900-912 and 922.

To register with the CMTS in phase (7) above, the CM forwards its configured class of service and any other operational parameters in the configuration file. (See DOCSIS section 9.2.8.) Certain encodings are found in the Registration Request and/or the Registration Response. For example, modem capabilities and vendor specific information are included in the registration request. (See DOCSIS sections C.1.3-C.1.3.2; C1.1.17).

Upstream Bandwidth Allocation

In DOCSIS, upstream bandwidth is divided into a stream of mini-slots, each of which is numbered relative to a master reference maintained by the CMTS. The CMTS generates the time reference for identifying the slots, and controls access to the slots by transmitting an upstream bandwidth allocation map (MAP) message on the downstream channel. For example, the MAP message may describe some slots as grants for data transmission to particular CMs, other slots as available for contention transmission, and other slots as an opportunity for new stations to join the link. The MAP is discussed in detail elsewhere herein and in FIGS. 4 and 5. CMs may request upstream bandwidth from the CMTS. Each CM times its transmissions so that the CMTS receives it in the specified time reference. (See DOCSIS 7.1; see also DOCSIS Media Access Control (MAC) elsewhere herein).

DOCSIS Physical Media Dependent Sublayer

The DOCSIS Physical Media Dependent (PMD) Sublayer is described in DOCSIS Section 4. This section defines electrical characteristics and protocols for a CM and CMTS with the aim of upstream and downstream interoperability between any compliant CM and CMTS.

The upstream PMD sublayer uses a FDMA/TDMA burst modulation format, providing five symbol rates and two modulation formats (QPSK and 16 QAM). The modulation format includes pulse shaping for spectral efficiency, is carrier-frequency agile, and has selectable output power level. The PMD sublayer format includes a variable-length modulated burst with precise timing beginning at boundaries spaced at integer multiples of 6.25 msec apart (which is 16 symbols at the highest data rate). Each burst supports flexible modulation, symbol rate, preamble, randomization of the payload, and programmable FEC encoding. All of the upstream transmission parameters associated with CM burst transmission outputs are configurable by the CMTS via MAC messaging. Many of the parameters are programmable on a burst-by-burst basis. (See DOCSIS section 4.2.1.)

DOCSIS divides the upstream channel transmission characteristics into three portions: (a) Channel Parameters, (b) Burst Profile Attributes, and (c) User Unique Parameters. The Channel Parameters include the symbol rate, the center frequency, and the 1024-bit Preamble Superstring. The Burst Profile Attributes are shared attributes corresponding to a burst type. The User Unique (Burst) Parameters may vary for each user even when using the same burst type on the same channel as another user. (See DOCSIS section 4.2.7). User Unique Parameters include Power Level, Offset Frequency (a fine frequency tuning/adjust), Ranging Offset (microseconds), Burst Length in mini-slots (optional, changes burst to burst), and Transmit Equalizer Coefficients. The CM must support all burst profiles commanded by the CMTS via the burst descriptors in the UCD and subsequently assigned for transmission in an allocation MAP message. (See DOCSIS section 4.2.7 Table 4-5.)

At higher channel widths, the symbol rate is higher. For example, the maximum channel width (i.e., the −30 db bandwidth) for a 160 ksym/sec symbol rate is 200 kHz. At 640 ksym/sec, the bandwidth increases to 800 kHz. At 2,560 ksym/sec, the bandwidth is 3,200 kHz. (See DOCSIS section 4.2.2.3 Table 4-3).

DOCSIS Media Access Control (MAC)

The DOCSIS MAC protocol features include: bandwidth allocation controlled by a CMTS; a stream of mini-slots in the upstream; mixed contention- and reservation-based upstream transmit opportunities; support of variable-length packets for bandwidth efficiency; support for a wide range of data rates, and quality of service support. (See DOCSIS 6.1.1.)

In DOCSIS, a MAC frame is the basic unit of transfer between MAC sublayers at the CMTS and the cable modem. The same basic structure is used in both the upstream and downstream directions. MAC frames are variable in length. The term "frame" is used in this context to indicate a unit of information that is passed between MAC sublayer peers. This is not to be confused with the term "framing" that indicates some fixed timing relationship. (See DOCSIS 6.2.2.)

MAC Management Messages are encapsulated in a standardized information frame which is encapsulated within the cable network MAC framing. (See DOCSIS 6.3.1.) An Upstream Channel Descriptor (UCD) management message is transmitted by the CMTS at periodic intervals. The UCD message defines the characteristics of the upstream channel. The UCD includes the following parameters: configuration change count (increments when any values change), mini-slot size (in units of 6.25 microseconds), upstream channel ID, downstream channel ID, symbol rate, frequency, preamble pattern, and burst descriptor. Each burst descriptor includes the modulation type, a differential encoding flag, preamble length and offset, FEC information, guard time size, and maximum burst size (See DOCSIS 6.3.3.) During normal operation, the upstream burst parameters may be changed by the CMTS by announcing new values in an Upstream Channel Descriptor Message (UCD). (DOCSIS 9.3.2).

A ranging request is transmitted by a CM at initialization and on request from the CMTS to determine network delay and request power adjustment. The CMTS responds to the ranging request with the following parameters: service ID, upstream channel ID, ranging status (indicates whether upstream messages are being received within acceptable limits), timing adjust information (the time by which to offset frame transmission so that the frame arrives at the expected mini-slot time at the CMTS), power adjust information (to ensure transmissions arrive at the CMTS at the desired power level), frequency adjust information (fine frequency adjust within a channel), CM transmitter equalization information, and upstream channel ID Override (identifies a channel with which the CM should redo initial ranging). (See DOCSIS 6.3.6.).

SUMMARY OF THE INVENTION

Generally a CM is initialized or ranged on a single channel, using burst profiles optimized for these initialization purposes, and then proceeds to use other burst profiles on this channel for requests and data communication. However, according to the present invention, a CM can be ranged on at least two carrier frequencies, or channels, at least one channel is narrowband and at least one channel is wideband. A CM with a larger amount of data to transfer would generally prefer to use the wideband channel for its higher burst capacity. The narrowband channel may be utilized for short packets; rather than let the narrowband channel idle in the absence of requests for short packet transmissions, long packets could be assigned to the narrowband channel, too, when it is immediately available.

Initializing a CM on multiple channels can be implemented using two methods. In the first method, the CM transmits a request in mini-slots to the headend indicating there are packets that require transmission. The first method permits at least two different techniques (Method 1A and Method 1B) that can be utilized to assign a single carrier CM to multiple channels. The first technique (Method IA) entails an alteration to the CM that is DOCSIS complaint. The CM is encoded with vendor specific information, during the manufacturing process, for identifying special capabilities to inform the headend that it desires to be initialized on more than one channel. The second technique (Method 1B) involves a modification to the DOCSIS specification. An additional byte is added to the registration message that informs the headend of its desire to be initialized on more than one channel. In the second method, the CM transmits a request in bytes to the headend indicating there are packets that require transmission.

BRIEF DESCRIPTION OF THE DRAWINGS/FIGURES

These and other features, aspects and advantages of the present invention will be more fully understood when considered with respect to the following detailed description, appended claims and accompanying drawings wherein:

DETAILED DESCRIPTION OF THE INVENTION

Introduction

Figure 1:
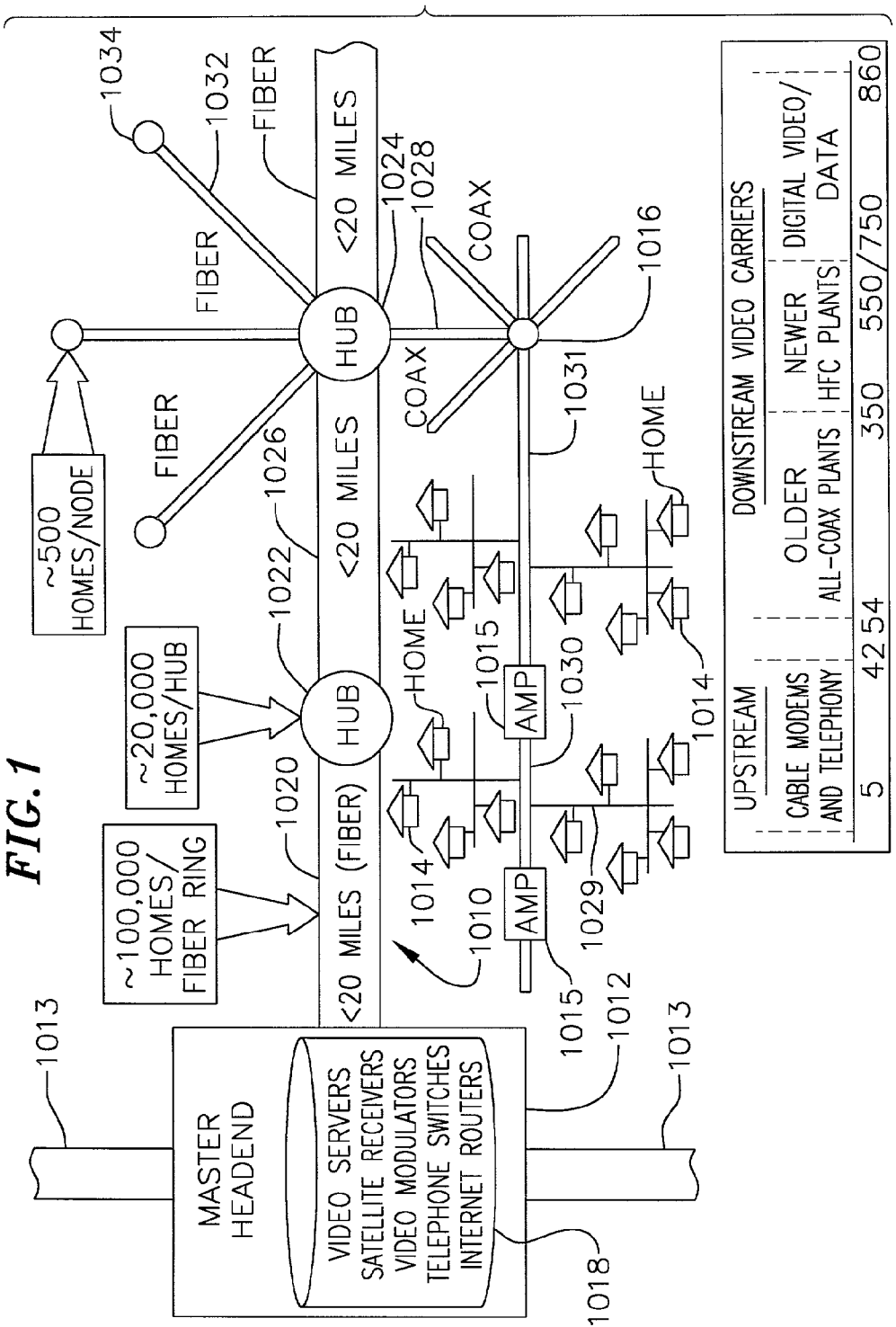
FIG. 1 is a schematic diagram of a hybrid fiber coaxial (HFC) network showing typical pathways for data transmission between the headend (which contains the cable modem termination system) and a plurality of homes (each of which contain a cable modem)

In a cable modem system, a headend or cable modem termination system (CMTS) is located at a cable company facility and functions as a modem which services a large number of subscribers. Each subscriber has a cable modem (CM). Thus, the cable modem termination system must be capable of facilitating bidirectional communication with any desired one of the plurality of cable modems.

As used herein, the cable modem termination system (CMTS) is defined to include that portion of a headend which facilitates communication with a plurality of cable modems. A typical cable modem termination system includes a burst receiver, a continuous transmitter and a medium access control (MAC).

The cable modem termination system communicates with the plurality of cable modems via a hybrid fiber coaxial (HFC) network, wherein optical fiber provides communication to a plurality of fiber nodes and each fiber node typically serves approximately 500 to 2,000 subscribers. These subscribers communicate with the node via a shared coaxial cable. It is this sharing of the common coaxial cable which necessitates that the number of cable modems attached thereto be limited so as to mitigate the likelihood of undesirable bit rate reductions which inherently occur when an excessive number of cable modems communicate simultaneously over a single coaxial cable.

The hybrid fiber coaxial network of a cable modem system utilizes a point-to-multipoint topology to carry out communication between the cable modem termination system and the plurality of cable modems. Frequency domain multiple access (FDMA)/time division multiplexing (TDM) is used to facilitate communication from the cable modem termination system to each of the cable modems, i.e., in the downstream direction. Frequency domain multiple access (FDMA)/time domain multiple access (TDMA) is used to facilitate communication from each cable modem to the cable modem termination system, i.e., in the upstream direction.

The cable modem termination system includes a downstream modulator for facilitating the transmission of data communications therefrom to the cable modems and an upstream demodulator for facilitating the reception of data communications from the cable modems.

Typically, the downstream modulator of the cable modem termination system utilizes either 64 QAM or 256 QAM in a frequency band of 54 MHz to 860 MHz to provide a data rate of up to 56 Mbps. Since the upstream channel has a much lower data rate requirement, the upstream demodulator typically uses either QPSK or 16 QAM in a frequency range of 5 MHz to 42 MHz to provide a data rate of up to 10 Mbps. In the future, larger upstream constellations will be put into practice, such as 64 QAM and beyond, to provide even higher upstream data rates.

The asymmetric data throughput defined by the upstream channel requiring a much lower data rate than the downstream channel results from the inherently larger amount of data which is communicated via the downstream channel during pay-per-view, Internet access and the like, wherein a video signal is communicated via the downstream channel, while only control signals such as those associated with viewing of the video signal are communicated via the upstream channel. Thus, the downstream channel requirement may exceed 1.5 Mbps, while the upstream channel requirement may be as low as 16 Kbps.

In the future, it is expected that cable transmission in the upstream direction will become broader band, because digital television transmission requires less bandwidth than analog television transmission.

Each cable modem includes an upstream modulator for facilitating the transmission of data to the cable modem termination system and a downstream demodulator for receiving data from the cable modem termination system. The upstream modulator of each cable modem uses either QPSK or 16 QAM within the 5 MHz to 42 MHz bandwidth of the upstream demodulator and the downstream demodulator of each cable modem utilizes either 64 QAM or 256 QAM in the 54 MHz to 860 MHz bandwidth of the downstream modulator (in North America).

Contemporary cable modem systems operate on a plurality of upstream channels and utilize time division multiple access (TDMA) in order to facilitate communication between a plurality of cable modems and a single cable modem termination system on each upstream channel. Typically, between 250 and 500 cable modems communicate with a single cable modem termination system on a given upstream channel.

In order to accomplish TDMA for upstream communication, it is necessary to assign time slots within which cable modems having a message to send to the cable modem termination system are allowed to transmit. The assignment of such time slots is accomplished by providing a request contention area in the upstream data path within which the cable modems are permitted to contend in order to place a message which requests additional time in the upstream data path for the transmission of their message. (Small data packets are sometimes also transmitted in contention regions.) The cable modem termination system responds to these requests by assigning time slots to the cable modems making such a request, so that as many of the cable modems as possible may transmit their messages to the cable modem termination system utilizing TDMA and so that the transmissions are performed without undesirable collisions.

Referring now to FIG. 1, a hybrid fiber coaxial (HFC) network 1010 facilitates the transmission of data between a headend 1012, which includes at least one cable modem termination system, and a plurality of homes 1014, each of which contains a cable modem. Such hybrid fiber coaxial networks are commonly utilized by cable providers to provide Internet access, cable television, pay-per-view and the like to subscribers.

Approximately 500 homes 1014 are in electrical communication with each node 1016, 1034 of the hybrid fiber coaxial network 1010, typically via coaxial cables 1029, 1030, 1031. Amplifiers 1015 facilitate the electrical connection of the more distant homes 1014 to the nodes 1016, 1034 by boosting the electrical signals so as to desirably enhance the signal-to-noise ratio of such communications and by then transmitting the electrical signals over coaxial cables 1030, 1031. Coaxial cable 1029 electrically interconnects the homes 1014 with the coaxial cables 1030, 1031, which extend between amplifiers 1015 and nodes 1016, 1034.

Each node 1016, 1034 is electrically connected to a hub 1022, 1024, typically via an optical fiber 1028, 1032. The hubs 1022, 1024 are in communication with the headend 1012, via optical fibers 1020, 1026. Each hub is typically capable of facilitating communication with approximately 20,000 homes 1014.

The optical fibers 1020, 1026 extending intermediate the headend 1012 and each hub 1022, 1024 defines a fiber ring which is typically capable of facilitating communication between approximately 100,000 homes 1014 and the headend 1012.

The headend 1012 may include video servers, satellite receivers, video modulators, telephone switches and/or Internet routers 1018, as well as the cable modem termination system. The headend 1012 communicates via transmission line 1013, which may be a T1 or T2 line, with the Internet, other headends and/or any other desired device(s) or network.

Figure 2:
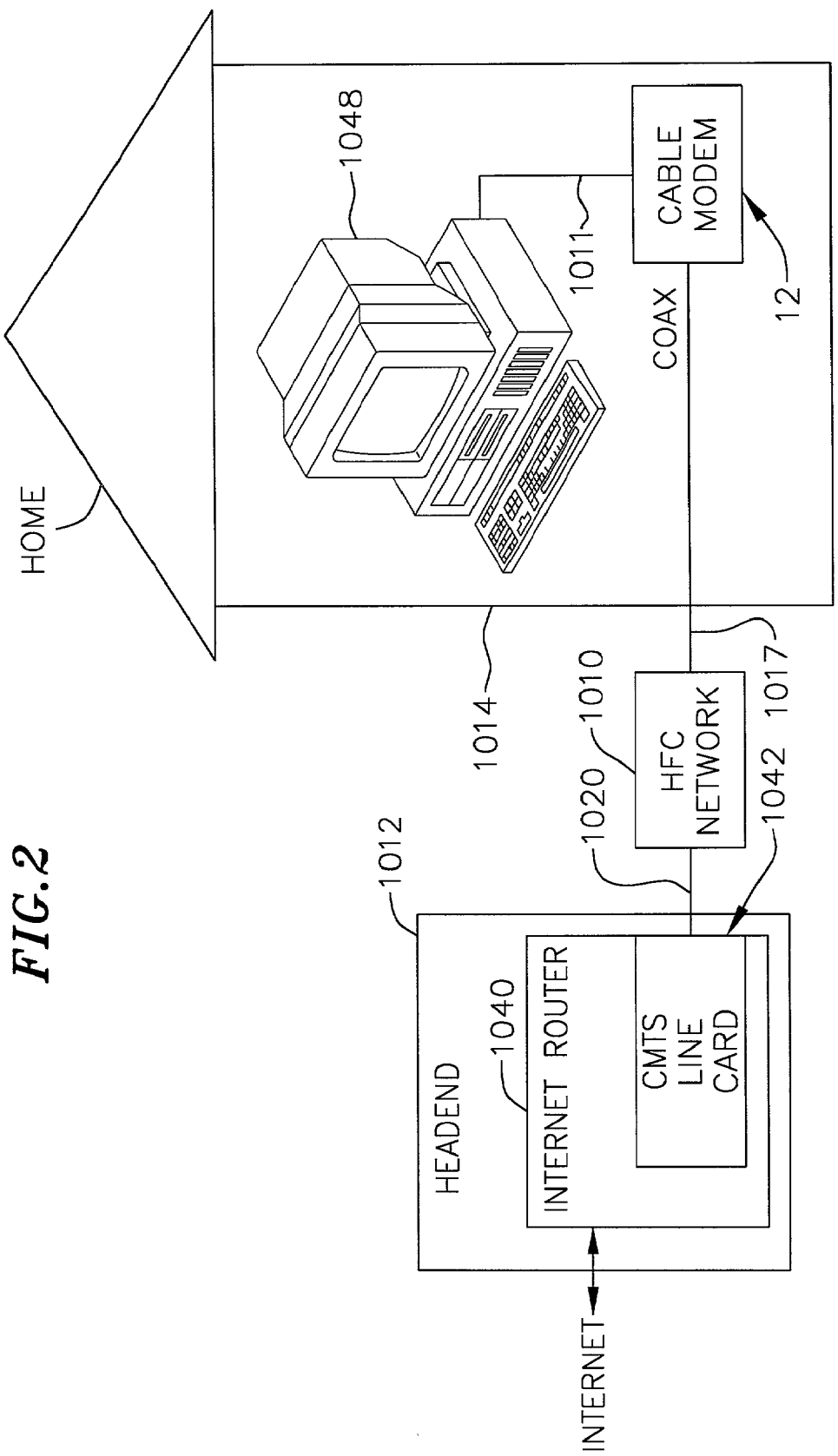
FIG. 2 is a simplified block diagram of a cable modem system wherein a line card which defines a cable modem termination system (CMTS) is disposed at the headend and a cable modem is disposed within a representative home.

Referring now to FIG. 2, a simplified block diagram shows the interconnection of the headend 1012 and an exemplary home 1014, wherein a cable modem 12 communicates with a cable modem termination system, embodied as a line card 1042, via hybrid fiber coaxial network 1010.

More particularly, a personal computer 1048, disposed within the home 1014, is connected via cable 1011 to the cable modem 12 which communicates via coaxial cable 1017 with the hybrid fiber coaxial network 1010, which in turn communicates via optical fiber 1020 with the cable modem termination system (CMTS) including line card 1042 of the headend 1012. Internet router 1040 facilitates communication between the headend 1012 and the Internet or any other desired device or network.

In a typical cable modem system, a single cable modem termination system including line card 1042 will typically communicate with between 250 and 500 cable modems 12. Thus, the cable modem system of the present invention includes a plurality of cable modems 12. Although the following description generally discusses the operation of a single cable modem termination system including line card 1042 and a single cable modem 12, those skilled in the art will appreciate that a plurality of cable modem termination systems including line cards 1042 and cable modems 12 may similarly be utilized.

Figure 3A:
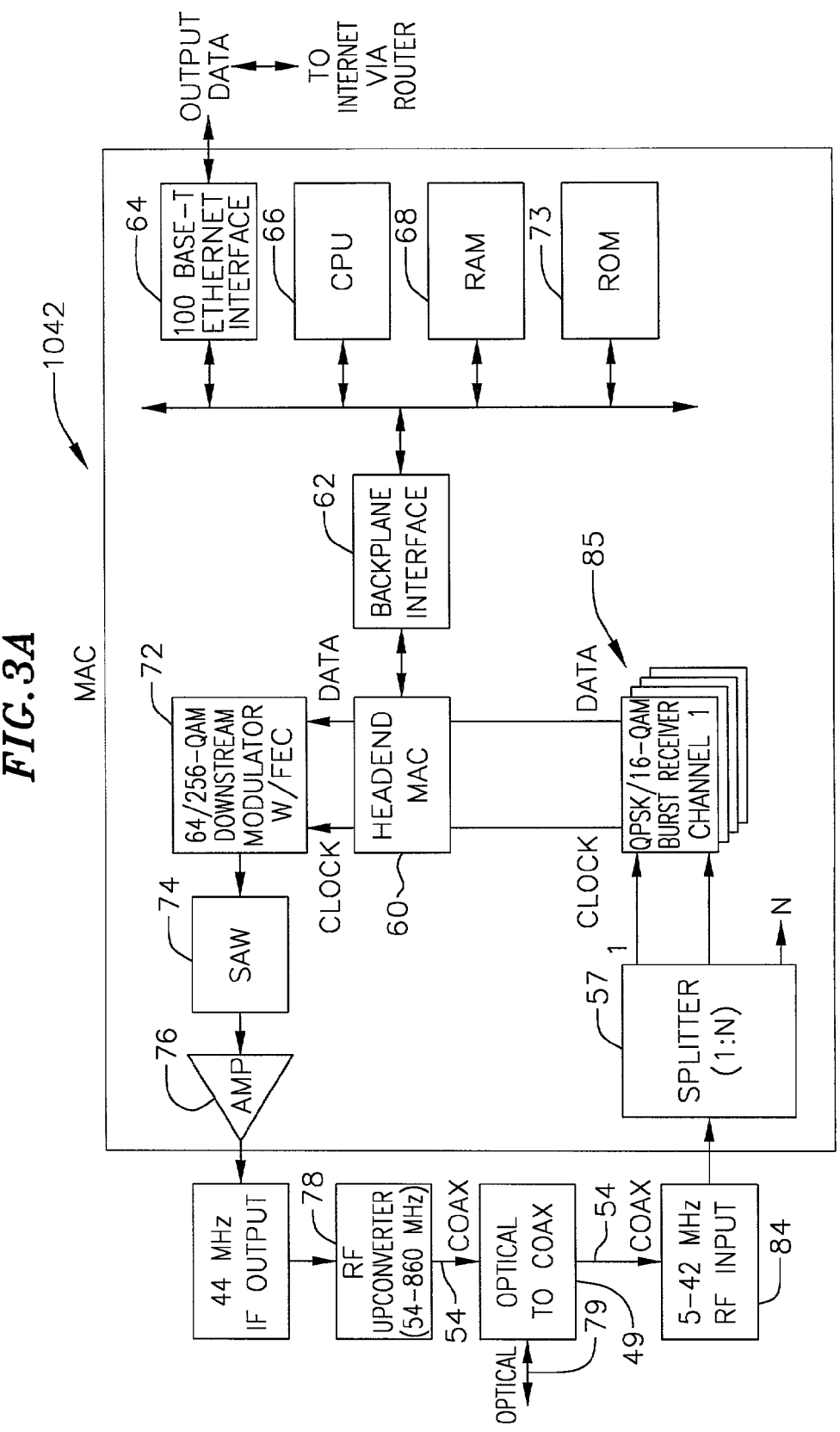
FIG. 3A is a schematic block diagram showing the interconnections of the burst receiver, medium access control (MAC) and transmitter downstream modulator within a cable modem termination system.

Referring now to FIG. 3A, the cable modem termination system including line card 1042 of FIG. 2 is shown in further detail. The cable modem termination system including line card 1042 is configured to receive signals from and transmit signals to an optical fiber 79 of the hybrid fiber coax (HFC) network 1010 (FIG. 2) via optical-to-coax stage 49, which is typically disposed externally with respect to the cable modem termination system including line card 1042. The optical-to-coax stage 49 provides an output to the 5-42 MHz RF input 84 via coaxial cable 54 and similarly receives a signal from the RF upconverter 78 via coaxial cable 54.

The output of the RF input 84 is provided to splitter 57 of the cable modem termination system including line card 1042, which separates the 5-42 MHz RF input into N separate channels. Each of the N separate channels is provided to a separate QPSK/16-QAM (or more) burst receiver channel 85.

Each separate QPSK/16-QAM burst receiver channel 85 is in electrical communication with the headend MAC 60. The headend MAC 60 is in electrical communication with backplane interface 62 which provides an interface to ROM 73, RAM 68, CPU 66, and 100BASE-T Ethernet interface 64.

The headend MAC 60 provides clock and a data output to the downstream modulator 72 which provides an output to amplifier 76 through surface acoustic wave (SAW) filter 74. Amplifier 76 provides an output to 44 MHz IF output, which in turn provides an output to the RF upconverter 78. However, future implementation may not require SAW.

Each burst receiver 85 is configured so as to be capable of receiving both QPSK (4-QAM) or 16-QAM signals. The QPSK signals provide 2 bits per symbol, wherein each bit has ±1 amplitude levels. The 16-QAM signals provide 4 bits per symbol, each bit having a ±1 or ±3 amplitude level on quadrature carriers.

However, the description and illustration of a burst receiver configured to accommodate QPSK and 16-QAM inputs is by way of illustration only and not by way of limitation. Those skilled in the art will appreciate that other modulation techniques, such as 32-QAM, 64-QAM and 256-QAM may alternatively be utilized.

Figure 3B:
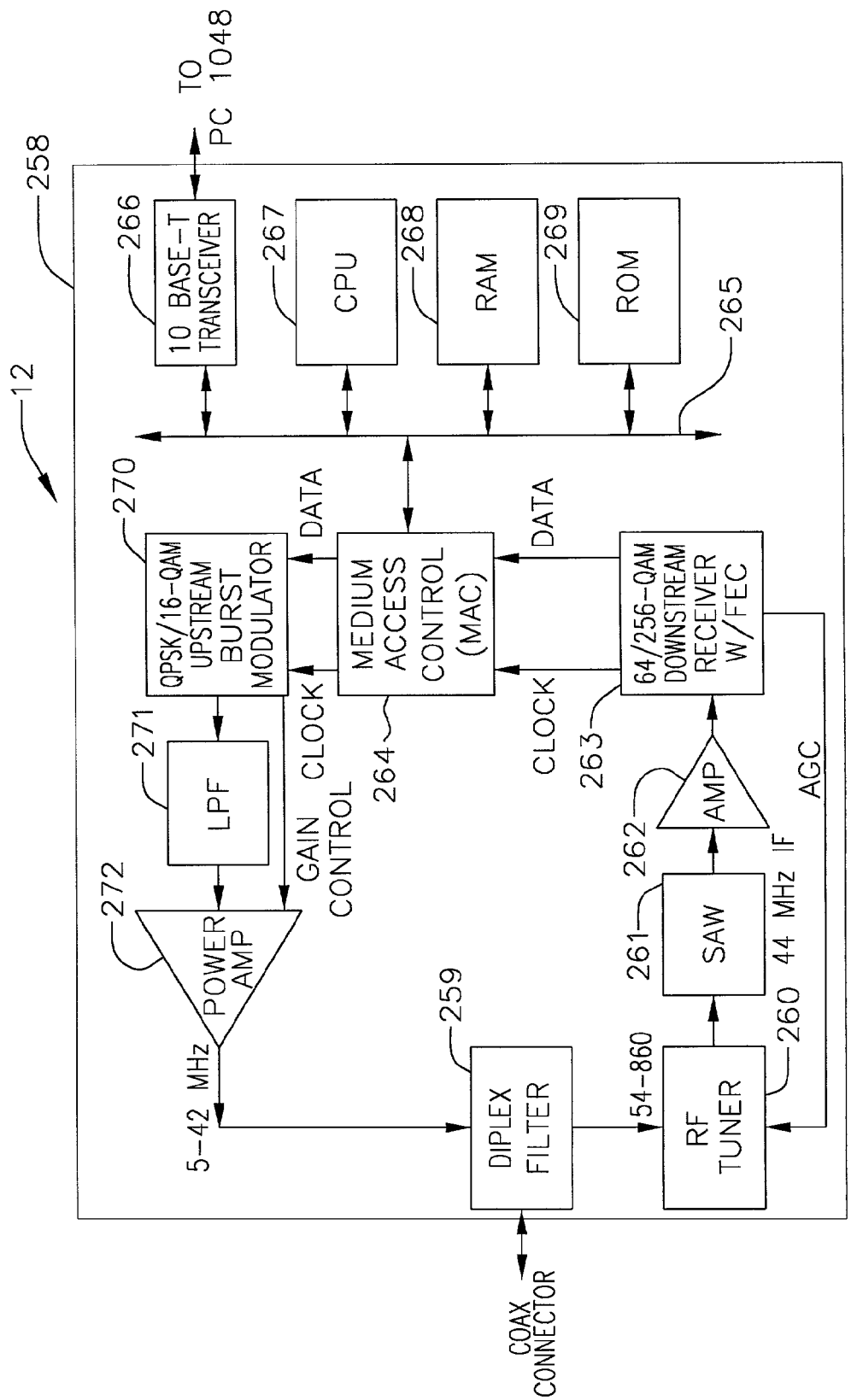
FIG. 3B is a schematic block diagram showing the construction of the cable modem, shown in FIG. 2, at the subscriber, such as the home.

The cable modem 12 in FIG. 2 is shown in detail in FIG. 3B within a rectangle 258. The system shown in FIG. 3B includes a diplex filter 259. The systems shown in FIGS. 3A and 3B can be combined into a single block diagram by rotating FIG. 3B through an angle of 180° so that the diplex filter 259 appears in inverted form at the right end and by then disposing the sheets adjacent each other.

The signals from the diplex filter 259 in the range of 54-860 MHz pass to an RF tuner 260 and then to a surface acoustic wave filter (SAW) 261 which provides signals at a suitable frequency such as approximately 44 MHz to an amplifier 262. The amplified signals pass to a 64/256-QAM downstream receiver 263 with forward error correction (FEC). Automatic gain controls are provided from the receiver 263 to the tuner 260. Clock and data signals then pass from the receiver 263 to a medium access controller (MAC) 264 which introduces signals through an interface 265 to of a 10 Base-T transceiver 266, a CPU 267, a random access memory (RAM) 268 and a read only memory (ROM) 269.

The signals from the 10 Base-T transceiver 266, the CPU 267, the RAM 268 and the ROM 269 pass through the interface 265 to the medium access controller (MAC) 264. The signals from the MAC controller 264 are then introduced to a QPSK-16 QAM upstream burst modulator 270 with forward error correction. (The upstream burst modulator 270 is not limited to QPSK-16 QAM shown, it is merely one embodiment.) The signals from the burst modulator 270 are provided to a low pass filter 271 which passes signals in the range of 5-42 MHz when the system is used in North America. The low pass signals are then introduced to a power amplifier 272, the output from which is provided to the diplex filter 259. The gain in the power amplifier 272 is regulated by the burst modulator 270.

In order to provide an enhanced understanding of the invention, certain terminology used in this application will now be defined. A "MAP" is provided from the headend 10 to the subscriber modem 12. A MAP defines a next frame. A "frame" is a generic term to define a group or a multiple number of slots.

Figure 4:
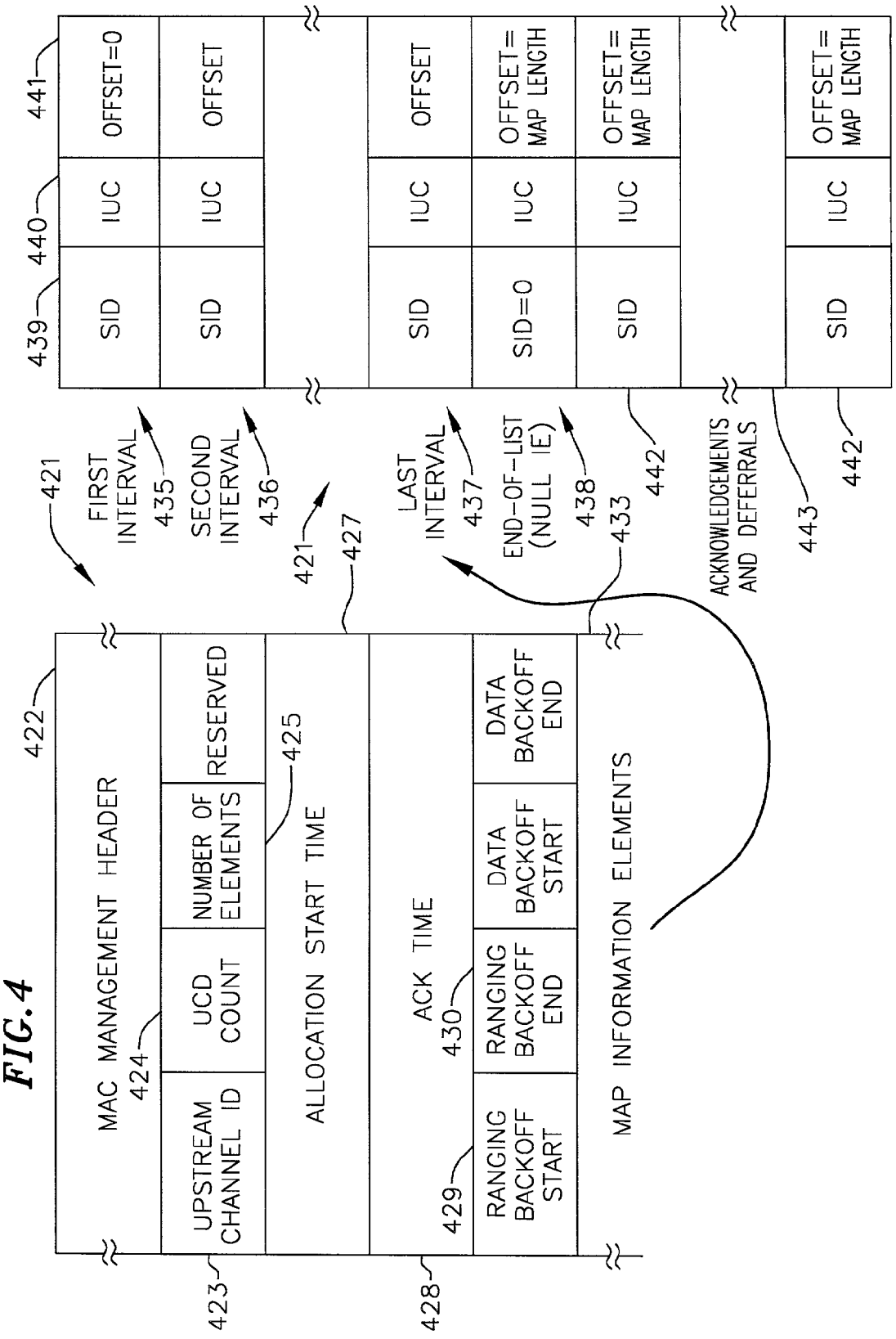
FIG. 4 is a graphical representation of the MAP message format prior to message filtering.
Figure 5:
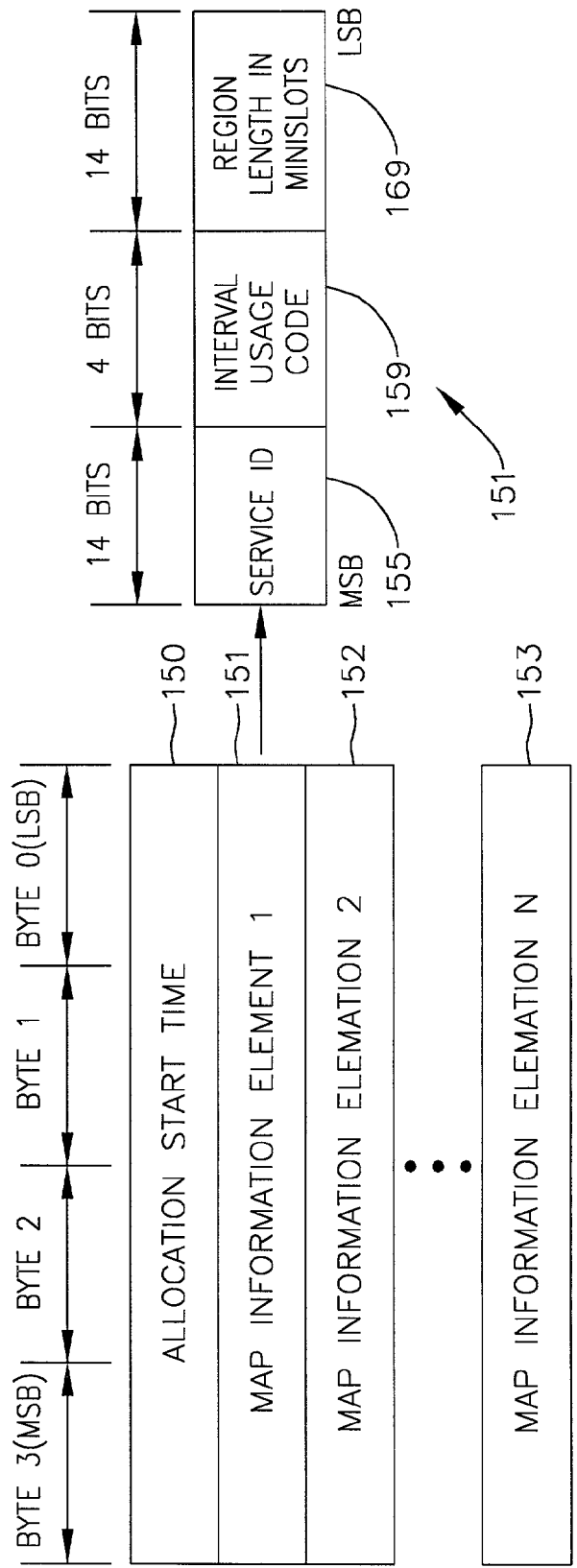
FIG. 5 is a graphical representation of the MAP message format after message filtering.

Additional details of a CM are presented with reference to FIGS. 4 and 5 for an enhanced understanding of the invention. Referring now to FIG. 4, the MAP message 421 format prior to processing by the message filter of the MAC is shown. The MAP message 421 typically contains a MAC management header 422 which contains information which facilitates desired processing by the MAC. An upstream channel ID 423 indicates which upstream frequency channel the MAP message is to be applied to. The UCD count 424 matches the value of the configuration change count of the UCD which describes the burst parameters which apply to the MAP.

The number of elements 425 provides an indication of the number of elements transmitted in this map. The allocation start time 427 indicates the effective start time from cable modem termination system initialization (in units of minislots) available for assignments according to this MAP. The acknowledgment (Ack) 428 indicates the latest time, from cable modem termination system initialization (in units of minislots) which has been processed in the upstream data communications. This time is used by the cable modems for collision detection purposes.

The ranging back-off start 429 is an initial back-off window for initial ranging contention, expressed as a power of two. Values for the ranging back-off start range from 0 to 15, wherein the highest order bits must be unused and set to O.

The ranging back-off end 430 is the final back-off window for initial ranging contention, expressed as a power of two. Values for the ranging back-off end 430 range from 0 to 15, wherein the highest order bits must be unused and set to O.

MAP information elements 433 define the time slots during which individual cable modems transmit on a particular upstream channel to the cable modem termination system. A plurality of intervals of the MAP, such as the first interval 435, the second interval 436, and the last interval 437, define the individual time slots.

Each interval 435-437 includes a station or service identifier (SID) value 439 which identifies the cable modem for which the interval (and therefore the time slot defined thereby, applies. SID equals 0 defines the end of the list of intervals, thus indicating that all intervals have been defined. The interval usage code (IUC) 440 defines the burst parameters to be utilized during the specified timing slot. Such burst parameters include the modulation type, e.g., QPSK or 16-QAM. The offset 441 indicates when, with respect to a common time reference, each interval begins. Offset equals 0 defines a beginning of the first interval.

Optionally, each MAP has a fixed length and format, such that unused intervals 442 may occur after the last interval 437. Acknowledgment and deferrals 443 optionally may be inserted into the list of intervals, generally after the end of list 438.

Referring now to FIG. 5, after the format of the MAP message has been filtered by the MAC for communication from the MAC to the burst receiver, the MAP message includes an allocation start time 150 and a plurality of MAP information elements 151-153. Each MAP information element generally includes a service ID 155 which identifies the cable modem for which the slot time of the MAP information applies, an interval usage code 159 which identifies the burst type utilized by the cable modem during the time slot, and also identifies the slot time, typically in units of minislots.

Improving Performance of Short Bursts in an Impulsive Noise Environment

In view of the above description of a CM, means for improving performance of short bursts in an impulsive noise environment is described. In the existing and developing standards for cable modems supporting two-way communications, the concept of a flexible upstream physical layer has been adopted. The nature of the flexibility in these existing and developing standards has evolved into an organization of the flexible parameters into "channel" parameters, "burst profile" parameters, and "user unique" parameters. "Channel" parameters include the carrier frequencies available to the CMs. "Burst profile" parameters include modulation, Diff Enc and preamble length. "User unique" parameters include power level, offset frequency and ranging offset. A complete list of "burst profile" and "user unique" parameters are listed in DOCSIS. {See DOCSIS section 4.2.7.) The concept for the utilization of these parameters is that the cable plant's headend will transmit to each cable modem (CM) a list of channel parameters and a list of burst profile parameters for a number of burst types to be operated on that channel. The CM will read the MAPS of grants from the headend, which will specify the burst type for each of the grants in the MAPS. The CMs will transmit with the appropriate attributes/characteristics on the grants which it is given.

Burst profiles on a given channel {i.e., carrier frequency) may differ in modulation type (QPSK or 16QAM for example), forward error correction (FEC) capability, and preamble length.

It is generally understood that a CM is initialized or ranged on a single channel, using burst profiles optimized for these initialization purposes, and then proceeds to use other burst profiles on this channel for requests and data communication. DOCSIS does not provide that a CM is ranged or initialized on two or more channels at the same time; in fact, there is no provision requiring the CM to store more than one set of user unique parameters, for example. It is possible that a CM's power level, frequency fine tuning, and ranging may be extrapolated to new carrier frequencies and symbol rates, with an expectation of success. However, there also is no provision in DOCSIS telling a CM that this extrapolation must occur, or what rules it should apply in this event. It is possible that if a CM recognizes a grant for it in a MAP on a channel it is not ranged for yet, that it would use its existing user unique parameters and comply with the grant. However, since this situation is not explicitly defined in DOCSIS, there is a possibility various CMs may implement their unique parameters—translated to a new carrier frequency and symbol rate—in differing fashions. (It is even possible that a CM may disregard some grants in a MAP if the grants are calling for different carrier frequencies.)

Currently, CMs cannot change back and forth between channels seamlessly. They cannot maintain a "ranged" (power level, fine frequency, timing, and even transmitter equalization) condition on more than one carrier frequency at a time. The standards do not anticipate and provide for this type of operation. This is especially true for the developing advanced physical layer standard, in which transmit equalization is supported at the CM, but there is no provision for requiring a CM to "remember" equalization for more than one carrier (or symbol rate) at a time.

Figure 6:
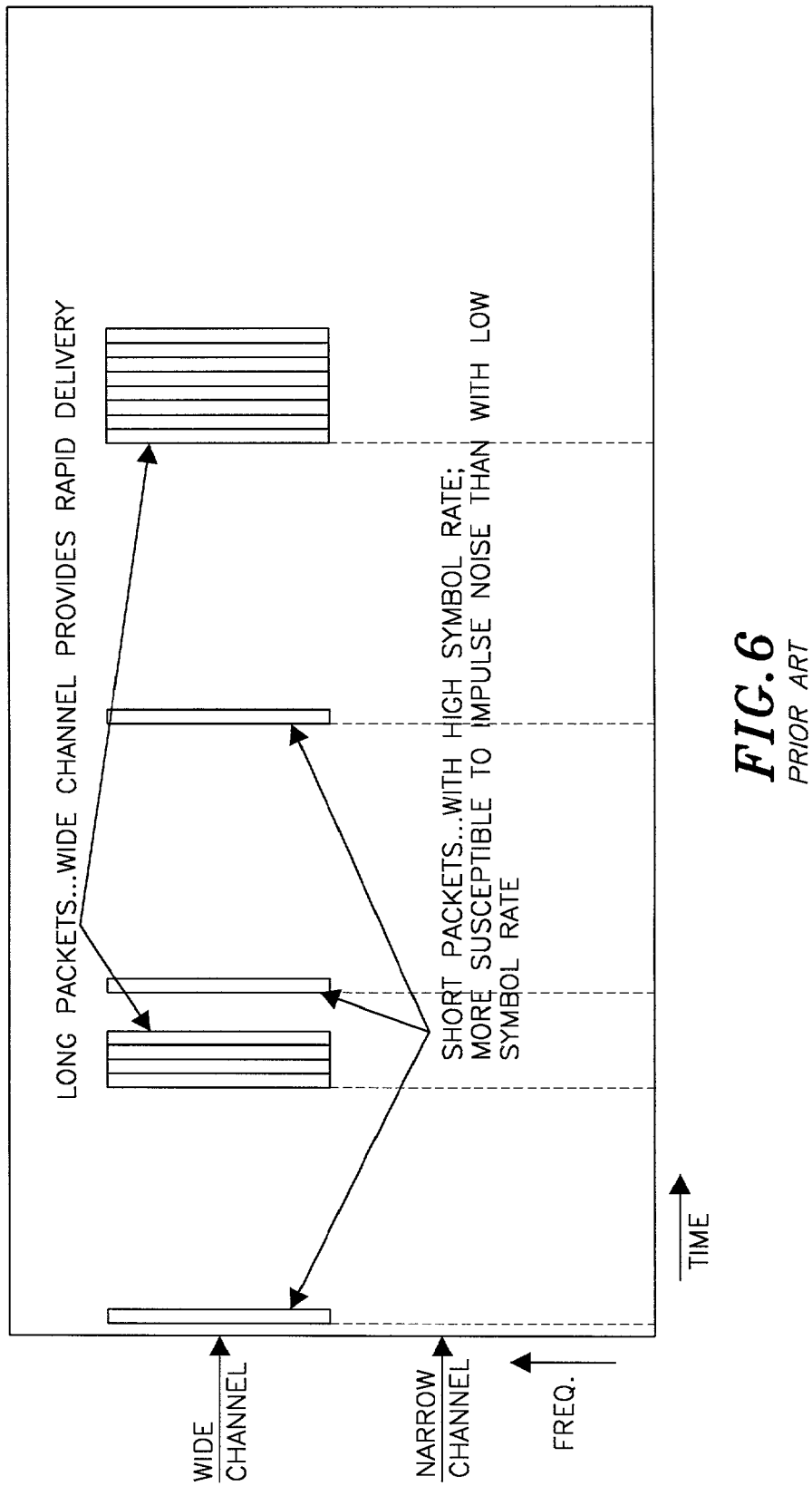
FIG. 6 is a graphical representation of the prior art of using a single-carrier CM in a wideband channel (high symbol rate) to handle all the CM's data traffic.
Figure 7:
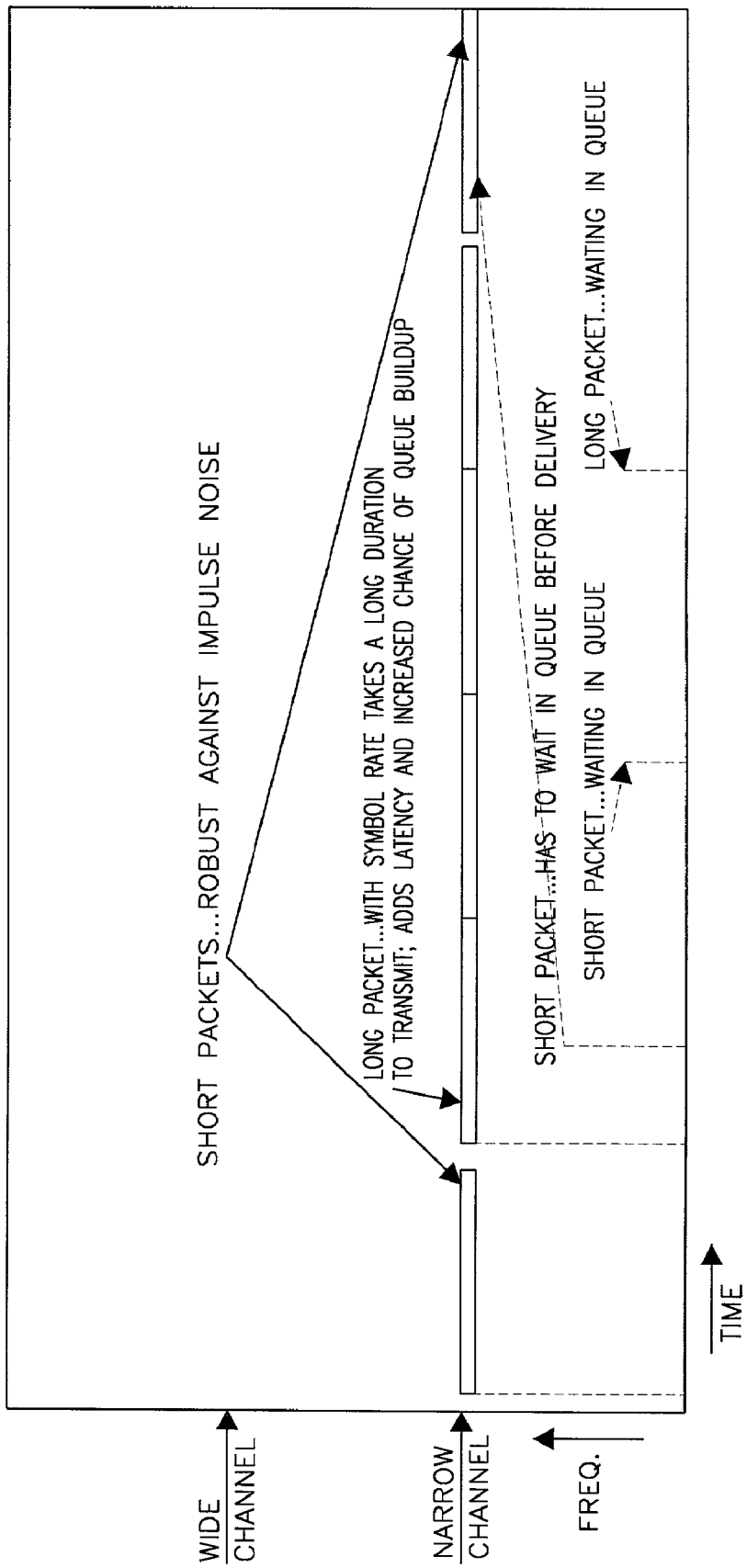
FIG. 7 is a graphical representation of the prior art of using a single-carrier CM in a narrowband channel (low symbol rate) to handle all the CM's data traffic.
Figure 8:
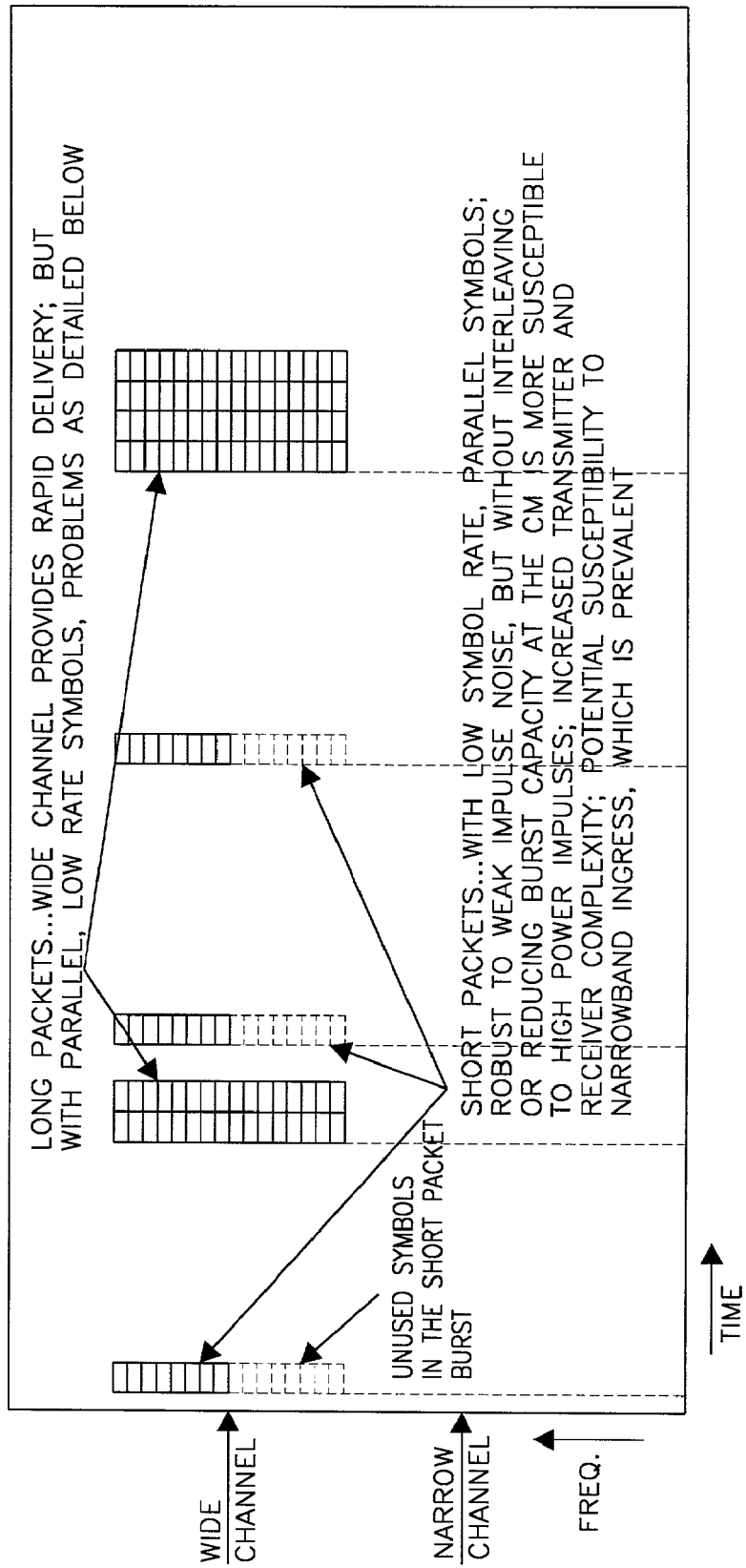
FIG. 8 is a graphical representation of the prior art of parallel, low symbol rate waveforms.

In the prior art, as shown in FIGS. 6-8, the CM operates with a different burst profile for short packets than for long packets, with the recognition that the physical layer is optimized for each case with different parameters, but the transmission uses the same channel or carrier frequency. A CM switches relatively seamlessly between the burst optimized for short packets and long packets on a given channel. However, the CM is always dedicated to either a wideband channel with its high data rate burst advantage, or to a narrowband channel with its robustness in impulse noise for short packets. A CM cannot take advantage of both of these desirable features. Currently there is a need to expand this burst flexibility to include transmitting the long packets and short packets on separate carrier frequencies, with high and low symbol rates (bandwidths), respectively (as well as other differences in the burst attributes).

FIG. 6 illustrates the prior art of using a single-carrier CM in a wideband channel (high symbol rate) to handle all the CM's data traffic. As mentioned earlier, the short packets are vulnerable to impulse noise; FEC can be applied but the necessary amount of parity is burdensome to the efficiency of short data packets.

FIG. 7 illustrates the prior art of using a single-carrier CM in a narrowband channel (low symbol rate) to handle all the CM's data traffic. The figure adequately illustrates the longer duration of transmission for long data packets, leading to more latency and buildup of the queue delay; this approach potentially suffers less efficient use of the upstream frequency resource.

FIG. 8 illustrates the prior art of using parallel, low symbol rate waveforms. While these modulation techniques provide some immunity to impulse noise due to the low symbol rate (in short packets), they come at the expense of (1) requiring significantly more detailed specifications (and thus testing); (2) requiring more computational intensity; (3) requiring more fidelity in the frequency and timing synchronization; and (4) they do not evolve as gracefully from the baseline cable modem physical layer (which is single-carrier), and thus potentially greatly impact testing and interfacing with higher layers in the communications networking stack.

As described above, simply lowering the symbol rate in single-carrier modulation, with short packets and impulse noise, can provide the robustness afforded by the more complex waveforms, but with a corresponding lowering of the data burst capacity of the CM. This lessening of the CM's burst capacity contributes a potential loss of network capacity owing to "statistical multiplexing," one CM may have a lot of data in its queue and not be able to utilize the full burst capacity of a wideband channel, while other CMs are idle. The network is under-utilized in this scenario.

Thus, in the prior art, achieving improved robustness in impulse noise, for short data packets, requires choosing either (1) single-carrier modulation and FEC, lowering the symbol rate which reduces burst capacity at a CM, or (2) parallel, low symbol rate waveforms, which significantly increase complexity on a variety of levels, from layering interfaces to detailed specifications for providing higher fidelity synchronization, all of which requires more testing. Means for achieving the robustness provided by lower symbol rates, while maintaining the simplicity of single-carrier modulation, but without foregoing burst capacity at a CM, is desired.

The present invention expands upon the philosophy of burst profiles optimized for packet length, and solves the problems faced in the prior art. It achieves the advantage of low symbol rate transmission for short packets in impulse noise without sacrificing burst capacity at a CM (with corresponding "statistical multiplexing" losses), and without the complexity of transmitting multiple symbol waveforms simultaneously at a CM.

Improving performance of short bursts in an impulsive noise environment can be accomplished by utilizing a single carrier CM on multiple channels. This can be implemented using two methods. In the first method, the CM transmits a request in mini-slots to the headend indicating there are packets that require transmission. In the second method, the CM transmits a request in bytes to the headend indicating there are packets require sending.

Request in Mini-Slots

Advantages Using Statistical Multiplexing

The CM remains single-carrier; the only difference is that now the CM maintains "ranging" on at least two carrier frequencies, or channels; at least one channel is narrowband and at least one channel is wideband. A CM with a large amount of data to transfer would generally prefer to use the wideband channel for its higher burst capacity. The narrowband channel may be utilized for short packets; rather than let the narrowband channel idle in the absence of requests for short packet transmissions, long packets could be assigned to the narrowband channel, too, when it is immediately available.

This can be achieved using fragmentation, i.e. the headend could give a grant to a CM for a particular channel that was not requested. A request for a grant of 14 mini-slots or more is indicative of a long packet requiring transmission over a wideband channel. A request for a grant of 13 mini-slots or less is indicative of a short data packet requiring transmission over a narrowband channel. With fragmentation, the headend could divide a long data packet into several shorter packets to transmit on available narrowband channels. For example, if the CM requests a grant for a long packet, the headend could grant transmission for multiple short packets, so the long data packet would be divided into several short packets for transmission. On the other hand, if the CM is requesting grants for several short packets, these short packets could be bundled together and be given a grant for a wideband channel. In other words, the headend can give grants that were not explicitly requested.

If many CMs have an abundance of long packets to transmit and few short packets, then the narrowband channel can be granted for long packet use by the scheduler, this only enhances network capacity. The upstream bandwidth remains fully utilized. If there is an abundance of short packets, then the CMs can be assigned and ranged on separate narrowband carriers. If the traffic reverts back to more long packets, then the narrowband channels can again be invoked for long packets and maintain the full utilization of the upstream bandwidth. This allows the CM to utilize more than one channel to transmit data packets.

In other words, long data packets can be assigned to the narrowband channel, using a robust and efficient burst profile (more efficient than for the short packets). The headend may respond to a request for a long data packet with a grant in the wideband channel, or if there is a deficit of short packets, may use the narrow channel rather than let it idle.

Expanding to Include Multiple Wideband Channels and Multiple Narrowband Channels If there is an under-utilization of the wideband channel owing to a shortage of upstream long data packet traffic, then in the limit, eventually, there will be only one wideband channel in the aggregate upstream band to service all the CMs. This channelization of the aggregate upstream bandwidth to service the traffic mix, varying the proportion of narrowband channels to wideband channels, provides advantages over the proposed low symbol rate schemes similar to "statistical multiplexing." The schemes using a multiplicity of low symbol rate waveforms assign or "range" each CM on a given carrier, presumably wideband. The number of such CMs assigned to a given carrier will depend on the traffic, but for a given number, there will be times (according to traditional traffic and multiplexing analyses) when there will be a backlog in the composite queues. With the high capacity of the wideband channel, this queue will be emptied as quickly as possible. However, there is still a fixed number of users sharing a fixed single wideband channel (at most 6.4 MHz).

With the present invention, a set of users may share a larger bandwidth than that of the widest channel. For example, twice the number of users may share one wideband channel, and be segmented among multiple narrowband channels, which equal the bandwidth of another wideband channel. While only one wideband channel is available to twice the number of users in this scenario, there is still twice the bandwidth available to this set of users. This doubling of pooled bandwidth shared by double the number of pooled users is heuristically the key component in the argument for the benefit of statistical multiplexing—larger pools of users sharing larger amounts of bandwidth leads to better network performance.

As mentioned previously, there are at least two methods to perform multiple channel initialization of a cable modem. The first method permits at least two different techniques (Method 1A and Method 1B) that can be utilized to assign a single carrier CM to multiple channels. The first technique (Method 1A) entails an alteration to the CM that is DOCSIS complaint, while the second technique (Method 1B) involves a modification to the DOCSIS specification.

Figure 9:
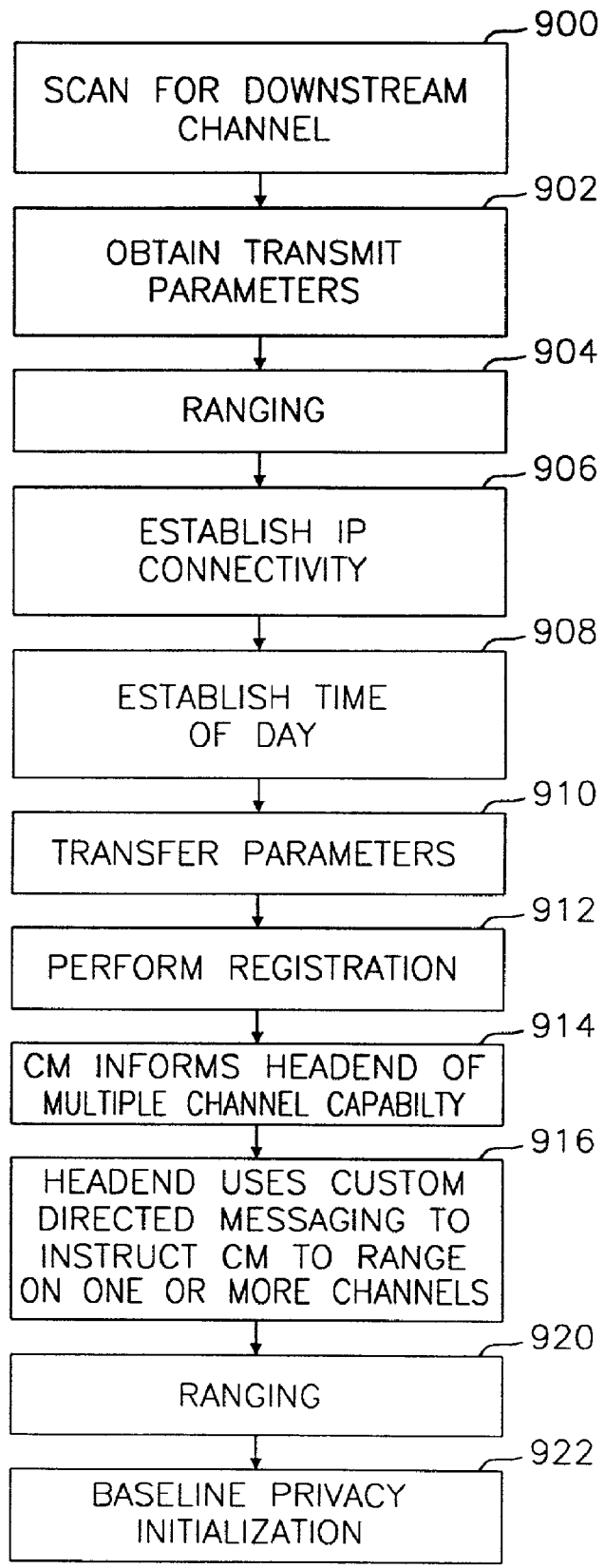
FIG. 9 is a flow diagram illustrating the overall flow between the stages of initialization in a CM for multiple channels and the headend assigning data packets to specific channels for transmission.

FIG. 9 illustrates the initialization process applicable to the first technique (Method 1A) for obtaining the overall flow between the stages of initialization of a CM on multiple channels and the headend assigning data packets to specific channels for transmission. However, the other techniques could follow the same model. Block 900 represents the first step in the process, the CM scanning for a downstream channel. This occurs not only during initialization, but also when there is a loss of signal. Upon initialization of a CM, the CM must acquire a downstream channel. In addition, it must also have non-volatile storage in which the last operational parameters are stored. The CM first tries to re-acquire the downstream channel that it had previously been using. If this fails, the CM must begin to continuously scan the 6 MHz channels of the downstream frequency band of operation until a valid downstream channel is found that it can use. The CM knows that a channel is valid when it has achieved (1) synchronization of QAM symbol timing; (2) synchronization of FEC framing; (3) synchronization of the MPEG packetization; and (4) recognition of SYNC downstream MAC messages. This first step is part of the standard process that is utilized in initializing a CM. (See DOCSIS Section 9.2.1.)

Block 902 represents the second step in the process, the CM obtaining transmit parameters. Once the CM has acquired a downstream channel, it must wait for an upstream channel descriptor (UCD) message. This message is transmitted by the CMTS so the CM can retrieve a set of transmission parameters for an upstream channel. The CMTS periodically transmits the parameters for all available upstream channels. The CM determines if it can use the upstream channel from its channel description parameters. It collects all UCDs which are different in their channel ID field and builds a set of channel IDs that it can use. After a suitable time has passed and the CM has not found a channel to use, it will search for another downstream channel to try.

Based upon the channel description parameters, the CM determines if it can use the upstream channel. Once it finds a channel to use, it extracts the parameters for this upstream channel from the UCD. After that, the CM waits for the next SYNC message and it extracts the upstream mini-slot timestamp from the message. After the CM receives a bandwidth allocation MAP for the selected channel, it can begin transmitting upstream in accordance with the MAC operation. This second step is part of the standard process that is utilized in initializing a CM. (See DOCSIS Section 9.2.2.)

Block 904 represents the third step in the process, ranging, performed on the CM. Ranging allows the CM to acquire the correct offset so that transmissions are aligned to the correct mini-slot boundary. The first step in the ranging process is for the CM to synchronize to the downstream and learn the upstream channel characteristics through the UCD MAC management message. It scans the Bandwidth Allocation MAP message to find an Initial Maintenance Region.

During the ranging process, each CM's timing offset is adjusted so that it appears to be located right next to the CMTS. This is done so that the amount of internal fixed delay is equivalent to putting the CM next to the CMTS. This amount includes not only the delays that are introduced through a particular implementation, but also include the downstream PHY interleaving latency.

When the Initial Maintenance transmit opportunity occurs, the CM sends a ranging request message. Due to the timing offset, it is as if the CM is sending the message as if it was physically at the CMTS. A return ranging response message is sent to the CM upon the CMTS successfully receiving the ranging message. Included in the ranging response message is a temporary SID that is assigned to the CM until the CM has completed the registration process (to be discussed with reference to block 912) as well as information on the RF power level adjustment, offset frequency adjustments and any timing offset corrections.

Now the CM waits for an individual Station Maintenance region assigned to its temporary SID. The CM must then transmit a ranging request message at this time using the temporary SID along with any power level and timing offset corrections.

The CMTS then returns another ranging response message to the CM with any additional fine tuning that is required. The ranging request/response steps are repeated until a notification is received that the ranging was successful. Once this has occurred, the CM joins the normal data traffic in the upstream. This third step is part of the standard process that is utilized in initializing a CM. (see DOCSIS Section 7.3.3.)

Block 906 represents the fourth step in the process, the CM establishing IP Connectivity. The CM invokes DHCP mechanisms to obtain an IP address and any other parameters that are required to establish IP connectivity. THE DHCP response needs to contain the name of a file which contains further configuration parameters. This fourth step is part of the standard process that is utilized in initializing a CM. (See DOCSIS Section 9.2.5.)

Block 908 represents the fifth step in the process, the CM establishing the time of day. It is important for both the CM and the CMTS to have the current data and time. This allows for time-stamping logged events which can be retrieved by the management system. There is no need for authentication and the time only needs to be accurate to the nearest second. This fifth step is part of the standard process that is utilized in initializing a CM. (See DOCSIS Section 9.2.6.)

Block 910 represents the sixth step in the process, the transfer of operational parameters. Once DHCP is successful, the CM downloads the parameter file using TFTP. If a CM downloads a configuration file that contains an upstream channel and/or downstream frequency different from what it is currently using, it must now send a registration request to the CMTS. It is then required to redo the initial ranging using the configured upstream channel and/or downstream frequency. This sixth step is part of the standard process that is utilized in initializing a CM. (See DOCSIS Section 9.2.7.)

With reference to block 910, when the parameters are received at a CM during initialization or later reset, they are transferred on bus 265 to RAM 268 under the control of CPU 267 where each parameter is mapped to a IUC. When bandwidth is granted to the CM, the parameters are retrieved from RAM 268 using the IUC in the grant. The disclosure of application Ser. No. 09/574,558 is incorporated fully herein by reference. With reference to this application, the timing adjustment parameter is loaded into timing offset detector 38 as illustrated in FIG. 6A, the power adjustment parameter is fed to power amplifier 272 for gain control purposes as illustrated in FIG. 5B, the channel parameter is fed to RF tuner 260 to select the specified channel, and the burst profile parameters are transferred to registers 562 to optimize the physical layer operation as illustrated in FIG.

Block 912 represents the seventh step in the process, the registration process required for the CM. Once the CM is initialized and configured, it must be authorized to forward traffic into the network. The CM is authorized to forward traffic into the network via registration. To register with a CMTS, the CM needs to forward it configured class of service and any other operational parameters in the configuration file to the CMTS as part of a registration request. The configuration parameters that are downloaded to the CM must include a network access control object. If this is set to "no forwarding", the CM must not forward data from attached CPE to the network, yet the CM must respond to network management requests. This allows the CM to be configured in a mode in which it is manageable but will not forward data. This seventh step is part of the standard process that is utilized in initializing a CM. (See DOCSIS Section 9.2.8.)

As indicated previously, blocks 900-912 represents the first seven steps of the standard process that is presently performed in DOCSIS for CM initialization. It assigns a single carrier CM to only one channel. Also, as discussed previously, a single carrier CM can be utilized on multiple channels.

Block 914 represents the eighth step in the process, the CM informs the headend of its multiple channel capability. The CM indicates to the headend that it can be initialized on more than one channel and also indicates how many additional channels to initialize on. As mentioned previously, the first technique (Method IA) entails an alteration to the CM that is DOCSIS compliant. During the manufacturing process of the CM, it can be encoded with vendor specific information for identifying special capabilities to let the headend know that it wants to be initialized on more than one channel. This will allow the CM to make requests on more than one channel. DOCSIS allows for this type of alteration. (See DOCSIS Section C.1.1.17.) The CM signals the headend that it wants to operate in this mode.

The CM goes through the standard initialization process up through the registration process. After the CM completes the registration step that is indicated in block 912, it signals, using "vendor specific information" provided for in DOCSIS, the headend that it wishes to be ranged on additional channels.

As mentioned earlier, the second technique (Method 1B) involves a modification to the DOCSIS specification. (See DOCSIS Section C.1.3.1.) During the registration process of block 912, the CM sends a message to the CMTS requesting initialization on at least one more channel. This requires adding an additional byte to the registration message. The addition of the byte will not create a burden on bandwidth because this occurs during the registration process. The additional byte is a new sub-type field that enables the CM to operate on multiple channels.

Block 916 represents the ninth step in the process, the headend utilizes custom directed messaging to instruct the CM to range on one or more additional channels. The headend sends an acknowledgment message back to the CM acknowledging the request to initialize on additional channels along with instructions to the CM on what additional channel or channels to initialize on.

Blocks 920 represents the tenth step in the process, ranging the CM on the additional channels. Block 920 repeats the same procedure described with reference to block 904 above.

Block 922 represents the final step in the process for initializing the CM, baseline privacy initialization. After the registration is complete and the CM is initialized on several channels, if the CM is provisioned to run baseline privacy, the CM must initialize baseline privacy operations. A CM is provisioned to run baseline privacy if its configuration file includes a baseline privacy configuration setting and if the privacy enable parameter is set to enable. This final step is part of the standard process that is utilized in initializing a CM. (See DOCSIS Section 9.2.9.)

Request in Bytes

With the first method described above, the CMTS does not know how many information bytes that the CM is actually requesting for a particular grant. The CM knows based upon rules in DOCSIS for particular information transfer, which burst profile it is suppose to use and then makes the request in terms of mini-slots. DOCSIS gives the CM a set of burst profiles and the CM decides which one is required for the particular grant that the CM is requesting. The CM is not sharing with the CMTS what information it wants to transmit.

With the second method, requests are made in bytes. Various levels of complexity of the first technique (Method 1A) also apply here to the second method. Adequate robustness and channel utilization via the scheduler is obtained when the requests are made in bytes. It is more qualified because of efficiency of channel usage, scheduling is more flexible. Also, the physical layer is used more efficiently because now the headend has all the information, it sees the various channel requirements, and so it can make the burst profile judgments. The CM may have dynamically changing conditions where the request has come to the headend while waiting to be granted, there is a burst of interference and the headend knows about it, but the CM can still communicate if given a robust enough profile. The headend can use alternative burst profile parameters and then give the CM the grant on the information packet that it still wants to transmit.

Figure 10:
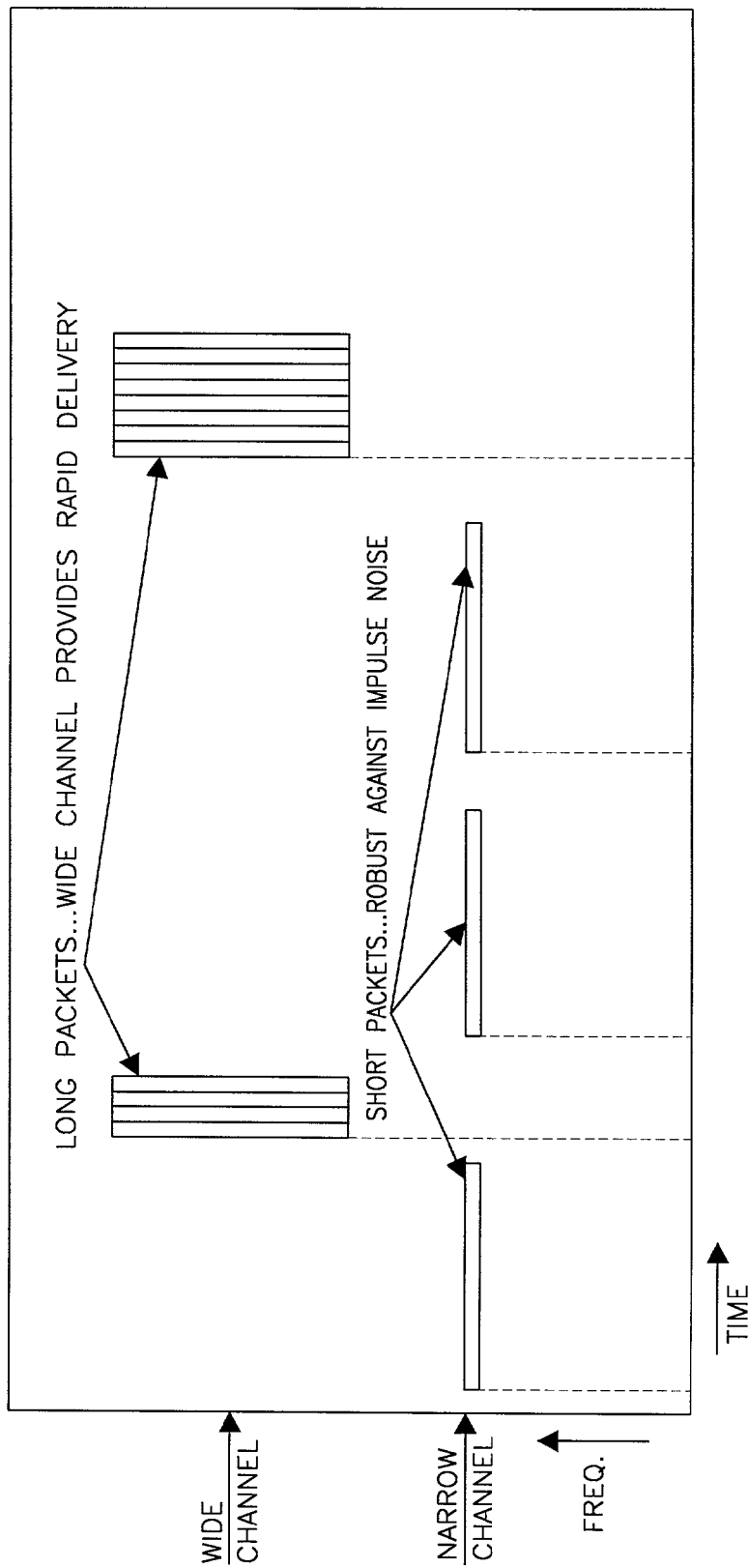
FIG. 10 illustrates time and frequency domain utilized with a CM implementing the techniques used by this invention.
Figure 11:
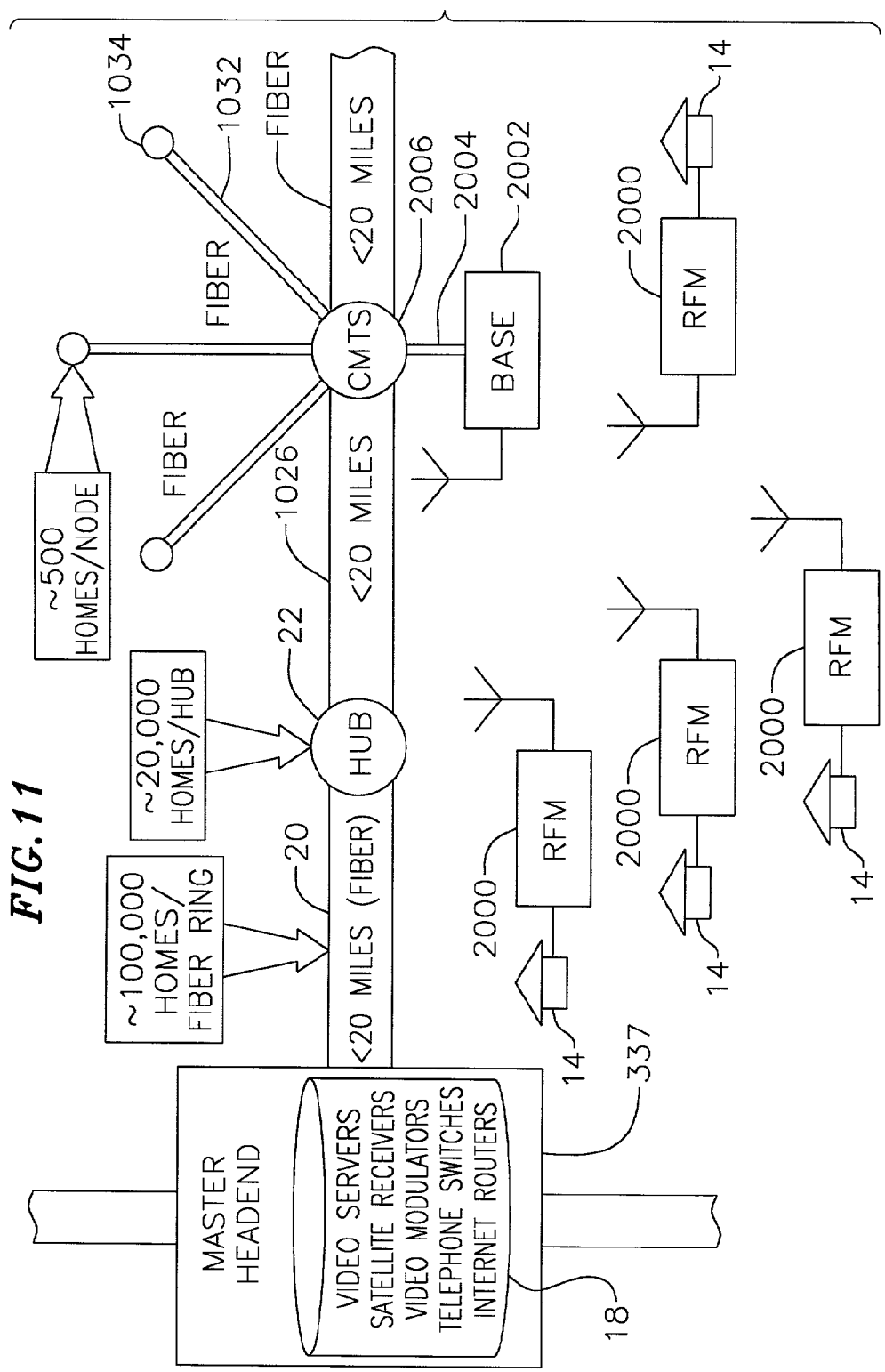
FIG. 11 is a modification of FIG. 1 adapting the invention to wireless transmission.

Illustrative Example of Time and Frequency Domain Utilizing a Single Cable Modem Using either the first method, request in mini-slots, or the second method, request in bytes, FIG. 10 is illustrative of time and frequency domain utilized with a CM implementing the techniques used by this invention. The headend may grant short data packets to a carrier using a narrow channel, and longer data packets to another carrier using a wide channel, in a fashion sophisticated enough that a given CM does not receive overlapping grants on the two channels. Performance of short bursts in an impulsive noise environment is improved.

Example Methods

FIGS. 14-17 illustrate flowcharts 1400, 1500, 1600, and 1700 of methods for transmitting packet(s) in a communication system in accordance with embodiments of the present invention. Flowcharts 1400, 1500, 1600, and 1700 will be described with continued reference to the example cable modem system described above in reference to FIG. 2.

Figure 14:
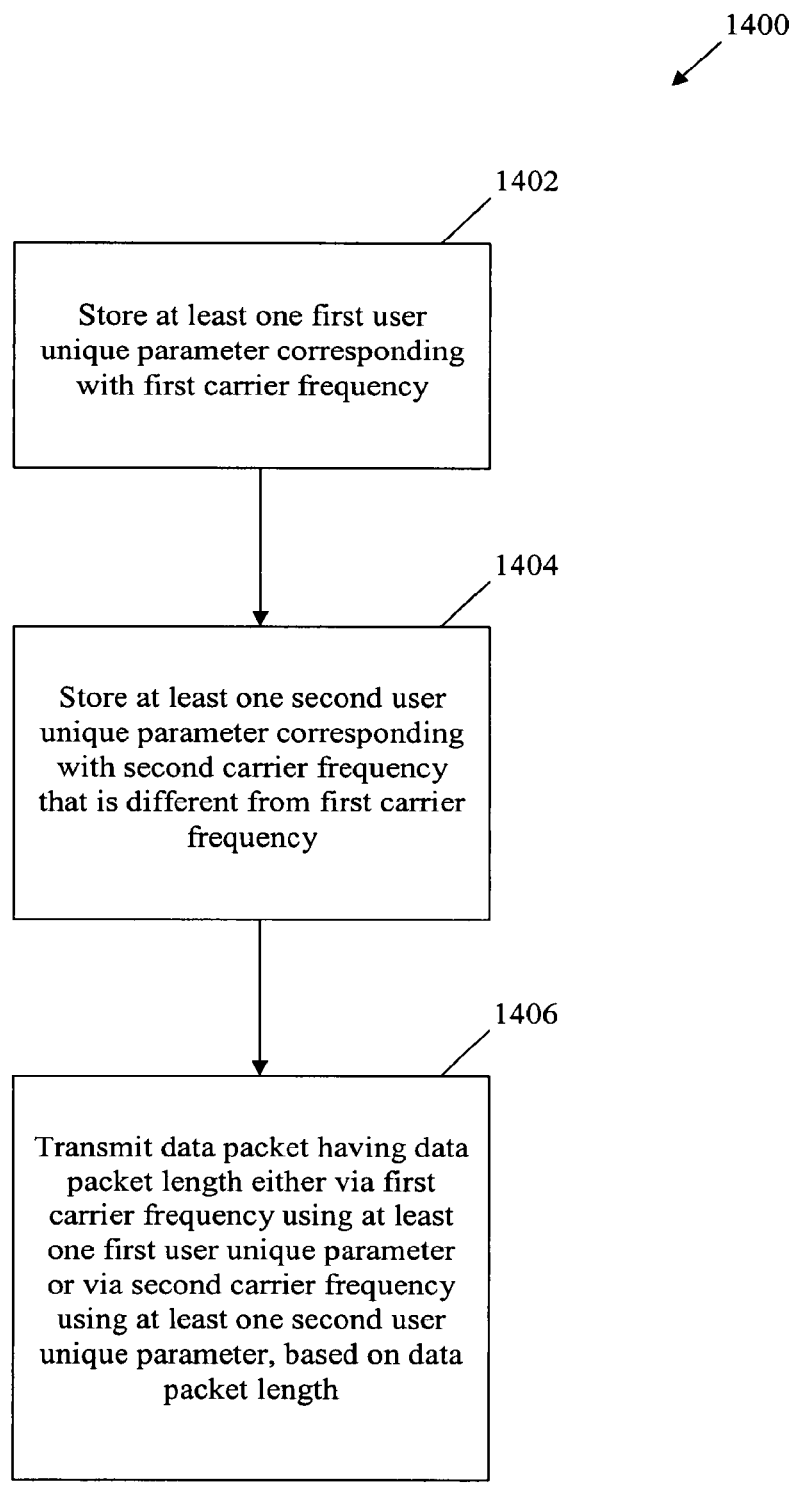
FIGS. 14-17 illustrate flowcharts of methods for transmitting packet(s) in a communication system in accordance with embodiments of the present invention.

Referring now to FIG. 14, at least one first user unique parameter corresponding with a first carrier frequency is stored at block 1402. For example, cable modem 12 may store the at least one first user unique parameter. At least one second user unique parameter corresponding with a second carrier frequency that is different from the first carrier frequency is stored at block 1404. For example, cable modem 12 may store the at least one second user unique parameter. At block 1406, a data packet having a data packet length is transmitted either via the first carrier frequency using the at least one first user unique parameter or via the second carrier frequency using the at least one second user unique parameter, based on the data packet length. For example, cable modem 12 may transmit the data packet to headend 1012 via HFC network 1010.

Figure 15:
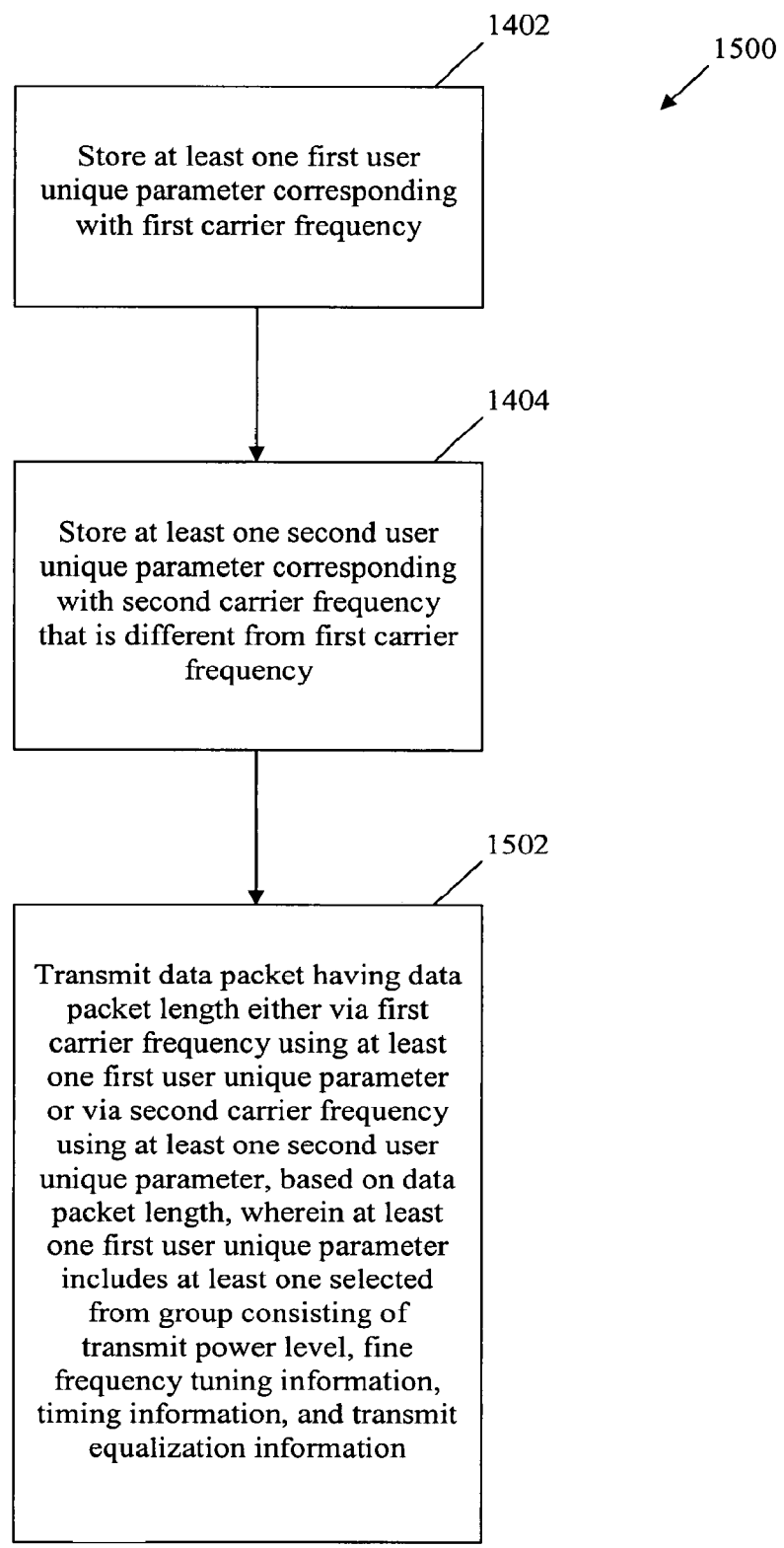

In FIG. 15, the data packet is transmitted at block 1502, which shows that the at least one first user unique parameter may include at least one selected from the group consisting of a transmit power level, fine frequency tuning information, timing information, and transmit equalization information.

Figure 16:
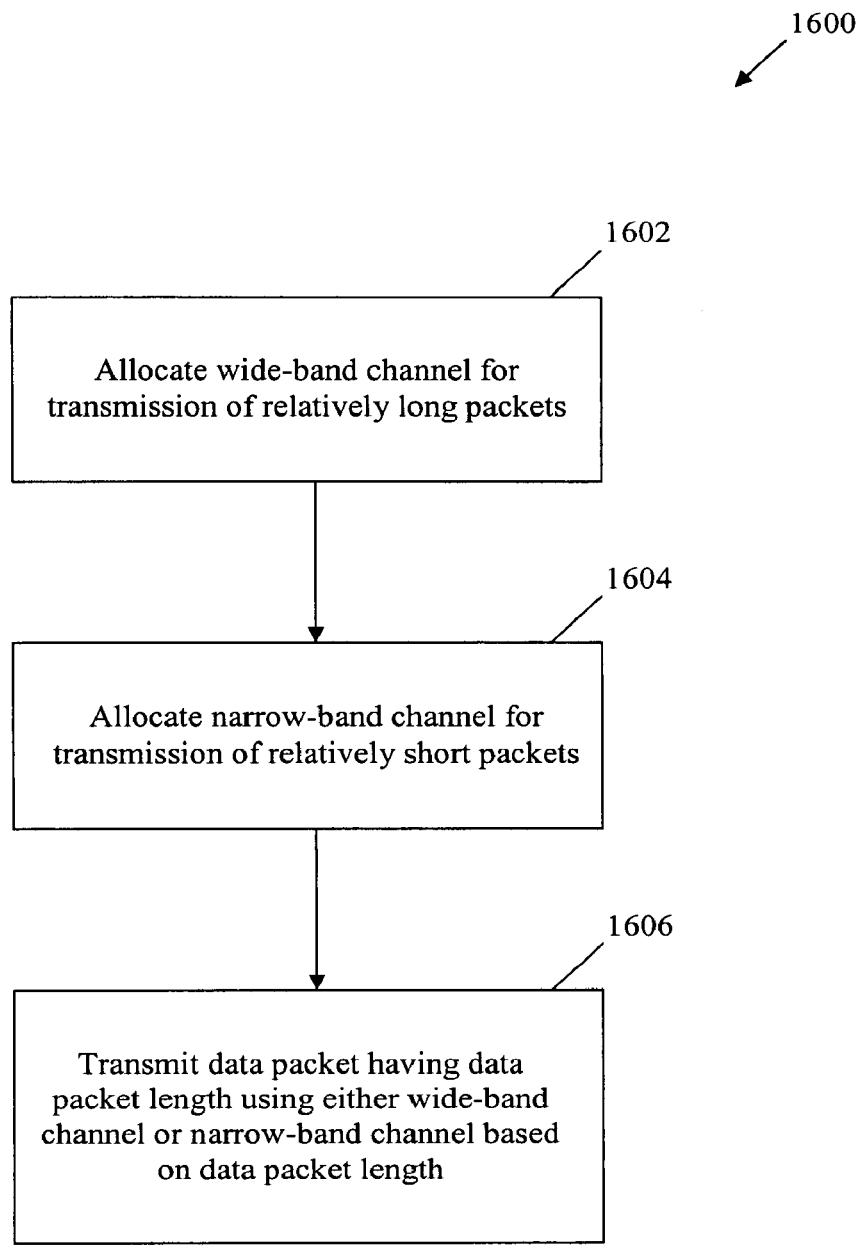

Referring to FIG. 16, a wide-band channel is allocated for transmission of relatively long packets at block 1602. For example, headend 1012 may allocate the wide-band channel. A narrow-band channel is allocated for transmission of relatively short packets at block 1604. For example, headend 1012 may allocate the narrow-band channel. At block 1606 a data packet having a data packet length is transmitted using either the wide-band channel or the narrow-band channel based on the data packet length. For example, cable modem 12 may transmit the data packet.

Figure 17:
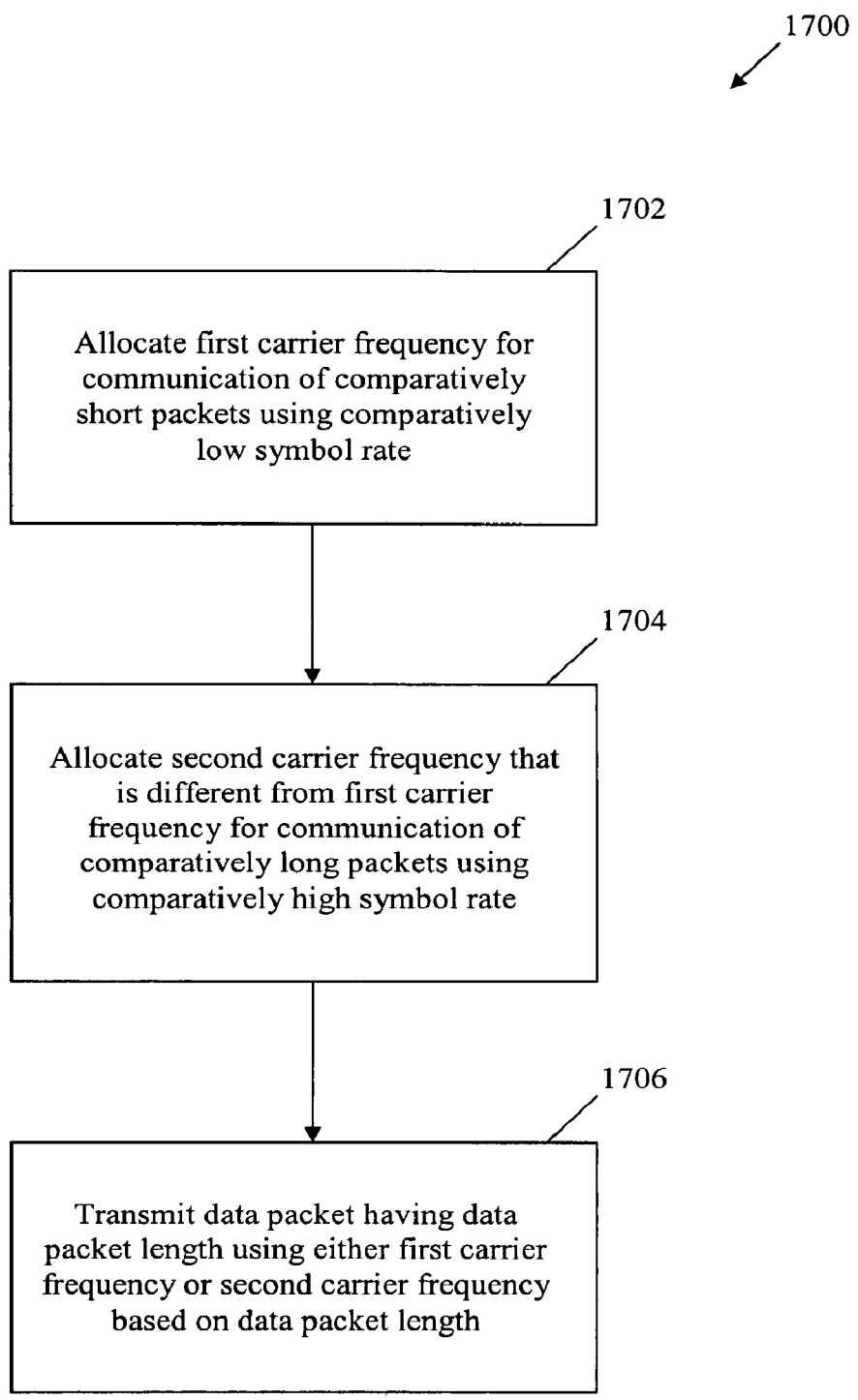

In FIG. 17, a first carrier frequency is allocated for communication of comparatively short packets using a comparatively low symbol rate at block 1702. For example, cable modem 12 or headend 1012 may allocate the first carrier frequency. A second carrier frequency that is different from the first carrier frequency is allocated for communication of comparatively long packets using a comparatively high symbol rate at block 1704. For example, cable modem 12 or headend 1012 may allocate the second carrier frequency. At block 1706, a data packet having a data packet length is transmitted using either the first carrier frequency or the second carrier frequency based on the data packet length.

Invention not Limited to Cable Media

Figure 12:
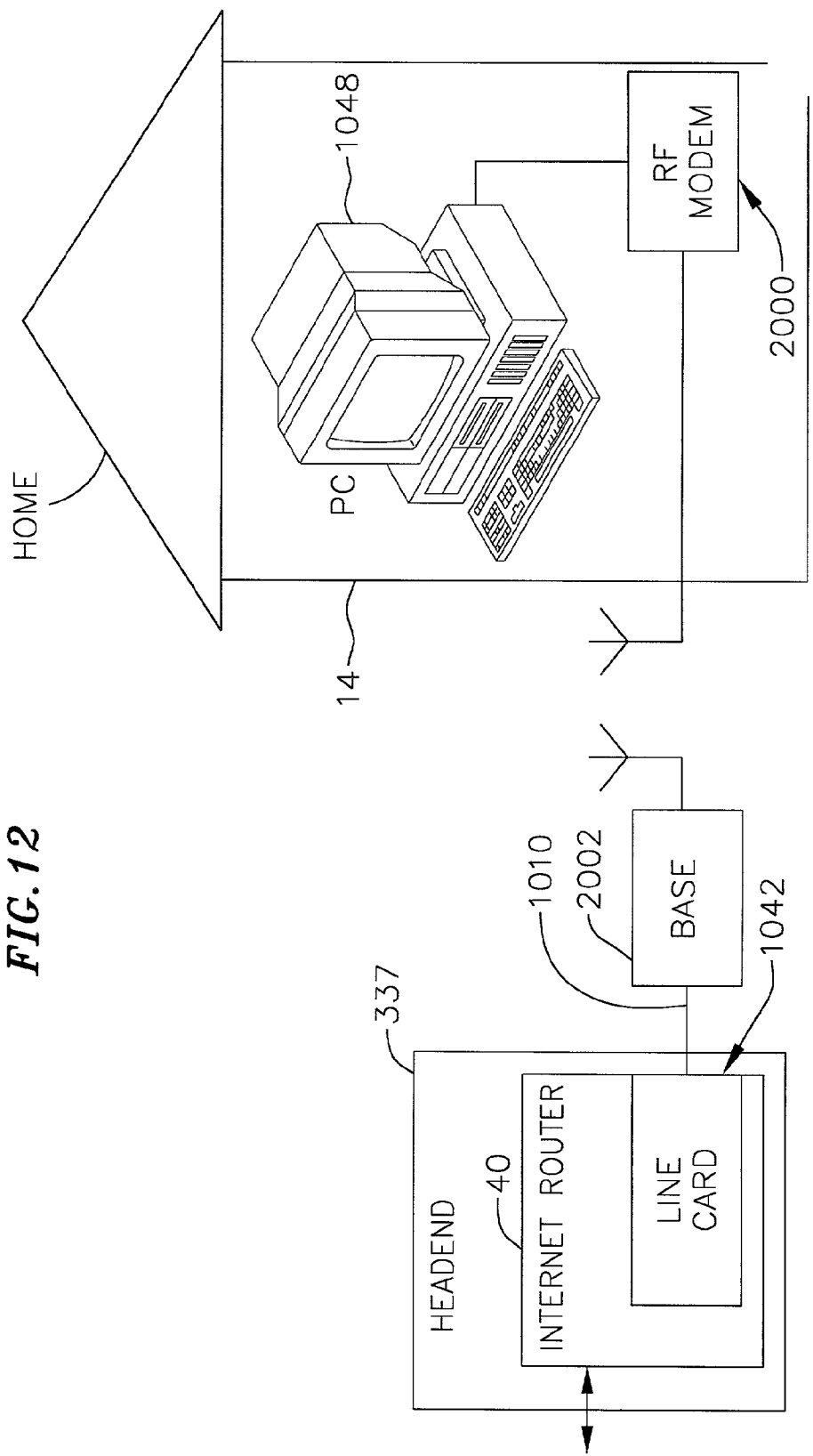
FIG. 12 is a modification of FIG. 2 adapting the invention to wireless transmission.
Figure 13:
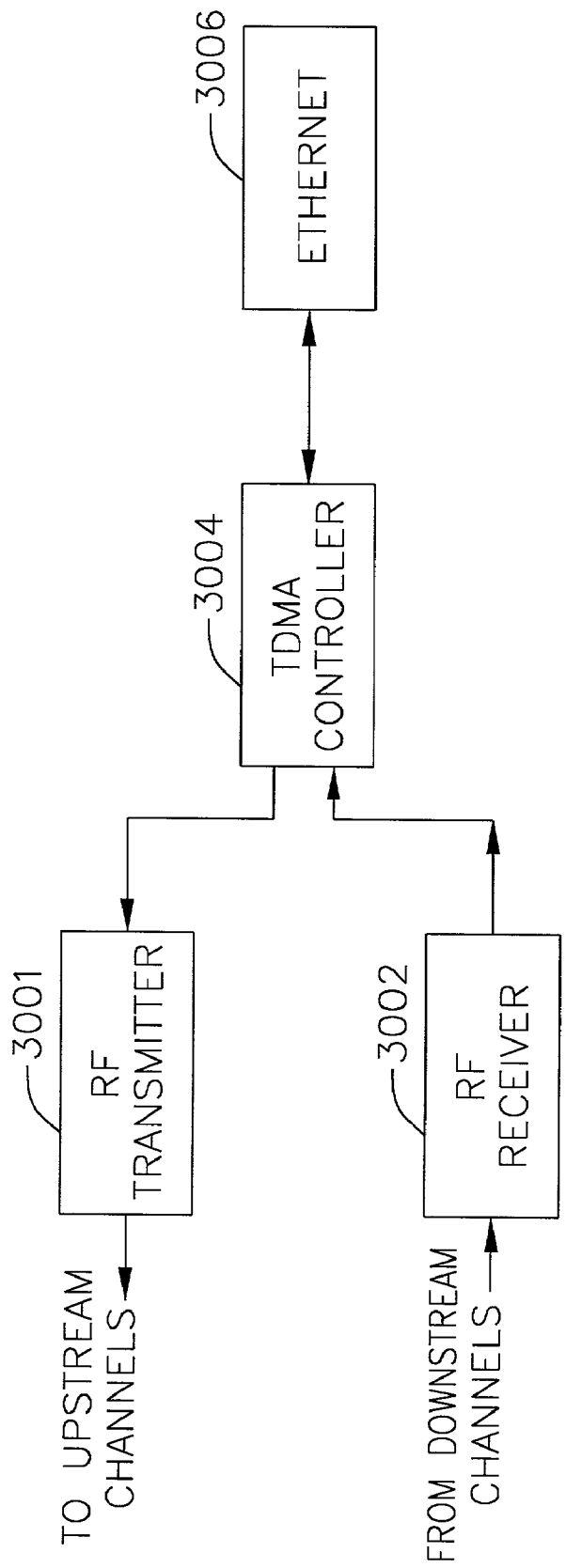
FIG. 13 is a schematic diagram of a single integrated circuit chip adapted to practice the invention.

Reference is now made to FIGS. 12 and 13 for a description of another embodiment of the invention. In this embodiment, there are wireless transmission links between homes 14 and HFC network 1010. Each of homes 14 is equipped with radio frequency modem (RFM) 2000. A base station 2002 is in wireless RF contact with RFM's 2000. The wireless architecture is similar to a cellular phone system. Base station 2002 is connected by a fiber 2004 to a CMTS hub 2006. Hub 2006 is part of HFC network 1010. Otherwise the components in FIGS. 12 and 13 are the same, and bear the same reference numerals, as those described in connection with FIGS. 2 and 3. As illustrated in FIG. 12, CMTS hub 2006 can be integrated in the same cable system that also services CM's connected by fiber to hub 22. Thus, upstream and/or downstream channels can be installed in a home without physically laying cable all the way to the home. If desired, the downstream channel could be fiber because of the large bandwidth requirement, and the upstream channel could be wireless because there is a smaller bandwidth requirement.

Previously Described Illustrative Embodiments not Limited

It is understood that the exemplary data packet fragmentation described herein represents only presently desired embodiments of the invention. Indeed, various modifications and additions may be made to such embodiments without departing from the spirit and scope of the invention. For example, requests to transmit data from cable modems need not be received by the cable modem termination system and the MAP need not be generated by the cable modem termination system, but rather requests may be received by an autonomous device, which operates independently of the cable modem termination system, and the MAPs may be generated by this or another autonomous device. Thus, these and other modifications and additions may be obvious to those skilled in the art and may be implemented to adapt the present invention for use in a variety of different applications. The described fragmentation capability can be enabled or disabled in the cable modems on a selective basis. Specifically, when a cable modem transmits a registration message to the CMTS at the time that the cable modem enters service, the acknowledging response of the CMTS includes a signal that either enables or disables fragmentation. If fragmentation is enabled, the cable modem and the CMTS operate as described above to fragment data to be transmitted upstream. If fragmentation is disabled, the cable modem only transmits data to the headend if the granted amount of bandwidth is the same as or larger than the bandwidth required to transmit the data. Alternatively, if fragmentation is disabled, the CMTS only transmits a grant if the requested bandwidth is the same as or smaller than the bandwidth available for transmission to the headend.

The described embodiments of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A method for transmitting data between a first modem and a second modem, comprising:
   (a) initializing the first modem on a first communication channel and a second communication channel to determine a first set of transmission parameters and a second set of transmission parameters, respectively;
   (b) receiving a first data packet for transmission at the first modem;
   (c) transmitting the first data packet to the second modem over the first communication channel using the first set of transmission parameters;
   (d) receiving a second data packet for transmission at the first modem; and
   (e) transmitting the second data packet to the second modem over the second communication channel using the second set of transmission parameters when the second communication channel is more suitable for transmission of the second data packet when compared to the first communication channel based upon at least one characteristic selected from among a group consisting of:
   a length of the second data packet;
   a bandwidth of the first communication channel;
   a bandwidth of the second communication channel;
   an error rate performance of the first communication channel; and
   an error rate performance of the second communication channel.

2. The method of claim 1, further comprising:
   (f) transmitting the second data packet to the second modem over the first communication channel using the first set of transmission parameters when the first communication channel is more suitable for transmission of the second data packet when compared to the second communication channel.

3. The method of claim 2, wherein step (f) comprises:
   (f)(i) fragmenting the second data packet into a plurality of second data packet fragments when the first communication channel is more suitable for transmission; and
   (f)(ii) transmitting each of the plurality of second data packet fragments to the second modem over the first communication channel using the first set of transmission parameters when the first communication channel is more suitable for transmission of the second data packet.

4. The method of claim 1, wherein step (e) comprises:
   (e)(i) transmitting the second data packet to the second modem over the second communication channel using the second set of transmission parameters when the second communication channel is available for transmission of the second data packet.

5. The method of claim 1, wherein the first communication channel and the second communication channel is a narrowband communication channel and a wideband communication channel, respectively, and wherein the first data packet and the second data packet is a short data packet and a long data packet, respectively.

6. The method of claim 5, wherein step (c) comprises:
   (c)(i) transmitting the short data packet to the second modem over the narrowband communication channel using the first set of transmission parameters, and wherein step (e) comprises:

(e)(i) transmitting the long data packet to the second modem over the wideband communication channel using the second set of transmission parameters, the wideband communication channel being more suitable for transmission of the long data packet when compared to the narrowband communication channel.

7. The method of claim 5, further comprising:

(f) fragmenting the long data packet into a plurality of long data packet fragments when the narrowband communication channel is more suitable for transmission of the long data packet when compared to the wideband communication channel; and (g) transmitting each of the plurality of plurality of long data packet fragments to the second modem over the narrowband communication channel using the first set of transmission parameters when the narrowband communication channel is more suitable for transmission of the second data packet.

8. The method of claim 1, wherein the first communication channel is characterized by a first carrier frequency and the second communication channel is characterized by a second carrier frequency, the first carrier frequency being different from the second carrier frequency.

9. The method of claim 1, further comprising:

(f) storing, by the first modem, the first set of transmission parameters and the second set of transmission parameters.

10. The method of claim 1, wherein step (a) comprises:

(a)(i) informing the second modem of a capability of the first modem to be initialized on the first communication channel and the second communication channel;

(a)(ii) receiving instructions from the second modem to perform a first ranging process and a second ranging process on the first communication channel and the second communication channel, respectively; and (a)(iii) performing the first ranging process and the second ranging process on the first communication channel and the second communication channel, respectively, to determine the first set of transmission parameters and the second set of transmission parameters, respectively.

11. The method of claim 10, wherein step (a)(i) comprises:

(a)(i)(A) sending vendor specific information stored in the first modem to the second modem, the vendor specific information indicating that the first modem is to be initialized on the first communication channel and the second communication channel.

12. The method of claim 10, wherein step (a)(i) comprises:

(a)(i)(A) sending a request to the second modem indicating that the first modem is to be initialized on the first communication channel and the second communication channel.

13. The method of claim 1, wherein at least one of the first set of transmission parameters and the second set of transmission parameters comprise at least one selected from a group consisting of:

a transmit power level;
fine frequency tuning information;
timing information; and
transmit equalization information.

14. The method of claim 1, wherein step (c) comprises:

(c)(i) wirelessly transmitting the first data packet to the second modem over the first communication channel using the first set of transmission parameters.

15. The method of claim 1, wherein step (e) comprises:

(e)(i) wirelessly transmitting the second data packet to the second modem over the second communication channel using the second set of transmission parameters when the second communication channel is more suitable for transmission of the second data packet when compared to the first communication channel.

16. The method of claim 1, wherein step (c) comprises:

(c)(i) transmitting the first data packet using a first carrier frequency to the second modem over the first communication channel using the first set of transmission parameters.

17. The method of claim 16, wherein step (e) comprises:

(e)(i) transmitting the second data packet using a second carrier frequency to the second modem over the second communication channel using the second set of transmission parameters when the second communication channel is more suitable for transmission of the second data packet when compared to the first communication channel.

18. A method for transmitting data between a first modem and a second modem, comprising:

(a) communicating an opportunity for the first modem to initialize on a first communication channel and a second communication channel to determine a first set of transmission parameters and a second set of transmission parameters, respectively;

(b) receiving, by the second modem, a first data packet from the first modem over the first upstream communication channel, the first data packet being sent from the first modem using the first set of transmission parameters;

(c) receiving, by the second modem, a second data packet from the first modem over the second communication channel when the second communication channel is more suitable for transmission of the second data packet when compared to the first communication channel, the second data packet being sent from the first modem using the second set of transmission parameters, and wherein the comparison to the first communication channel is based upon at least one characteristic selected from among a group consisting of:

a length of the second data packet;
a bandwidth of the first communication channel;
a bandwidth of the second communication channel;
an error rate performance of the first communication channel; and
an error rate performance of the second communication channel.

19. The method of claim 18, further comprising:

(d) receiving, by the second modem, the second data packet from the first modem over the first communication channel when the first communication channel is more suitable for transmission of the second data packet when compared to the second communication channel.

20. The method of claim 19, wherein step (d) comprises:

(d)(i) receiving each of a plurality of second data packet fragments from the first modem over the first communication channel when the first communication channel is more suitable for transmission of the second data packet; and (d)(ii) reassembling the plurality of second data packet fragments into the second data packet.

21. The method of claim 18, wherein step (c) comprises:

(c)(i) receiving the second data packet from the first modem over the second communication channel when the second communication channel is available for transmission of the second data packet.

22. The method of claim 18, wherein the first communication channel and the second communication channel is a narrowband communication channel and a wideband communication channel, respectively, wherein the first data packet and the second data packet is a short data packet and a long data packet, respectively.

23. The method of claim 22, wherein step (b) comprises:
(b)(i) receiving the short data packet from the first modem over the narrowband communication channel, and wherein step (c) comprises:
(c)(i) receiving the long data packet from the first modem over the wideband communication channel, the wideband communication channel being more suitable for transmission of the long data packet when compared to the narrowband communication channel.

24. The method of claim 22, further comprising:
(d) receiving each of a plurality of long data packet fragments from the first modem over the narrowband communication channel when the narrowband communication channel is more suitable for transmission of the second data packet; and
(e) reassembling the plurality of long data packet long into the long data packet.

25. The method of claim 18, wherein the first communication channel is characterized by a first carrier frequency and the second communication channel is characterized by a second carrier frequency, the first carrier frequency being different from the second carrier frequency.

26. The method of claim 18, wherein step (a) comprises:
(a)(i) receiving an indication from the first modem of a capability to be initialized on the first communication channel and the second communication channel;
(a)(ii) sending instructions to the first modem to perform a first ranging process and a second ranging process on the first communication channel and the second communication channel, respectively; and
(a)(iii) performing the first ranging process and the second ranging process on the first communication channel and the second communication channel, respectively, to determine the first set of transmission parameters and the second set of transmission parameters, respectively.

27. The method of claim 26, wherein step (a)(i) comprises:
(a)(i)(A) receiving vendor specific information stored in the first modem, the vendor specific information indicating that the first modem is to be initialized on the first communication channel and the second communication channel.

28. The method of claim 26, wherein step (a)(i) comprises:
(a)(i)(A) receiving a request from the first modem indicating that the first modem is to be initialized on the first communication channel and the second communication channel.

29. The method of claim 8, wherein at least one of the first set of transmission parameters and the second set of transmission parameters comprise at least one selected from a group consisting of:
a transmit power level;
fine frequency tuning information;
timing information; and
and transmit equalization information.

30. The method of claim 18, wherein step (b) comprises:
(b)(i) wirelessly receiving the first data packet from the first modem over the first upstream communication channel.

31. The method of claim 18, wherein step (c) comprises:
(c)(i) wirelessly receiving the second data packet from the first modem over the second communication channel when the second communication channel is more suitable for transmission of the second data packet when compared to the first communication channel.

32. The method of claim 18, wherein step (b) comprises:
(b)(i) receiving the first data packet from the first modem over the first communication channel using a first carrier frequency.

33. The method of claim 32, wherein step (c) comprises:
(c)(i) receiving the second data packet from the first modem over the second communication channel using a second carrier frequency when the second communication channel is more suitable for transmission of the second data packet when compared to the first communication channel.

34. A method for transmitting data between a first modem and a second modem, comprising:
(a) initializing the first modem on a first communication channel and a second communication channel to determine a first set of transmission parameters and a second set of transmission parameters, respectively;
(b) receiving a first data packet for transmission at the first modem;
(c) transmitting the first data packet to the second modem over the first communication channel using the first set of transmission parameters;
(d) receiving a second data packet for transmission at the first modem; and
(e) transmitting the second data packet to the second modem over the second communication channel using the second set of transmission parameters when the second communication channel is more suitable for transmission of the second data packet when compared to the first communication channel,
wherein the first communication channel and the second communication channel is a narrowband communication channel and a wideband communication channel, respectively, and wherein the first data packet and the second data packet is a short data packet and a long data packet, respectively.

35. A method for transmitting data between a first modem and a second modem, comprising:
(a) communicating an opportunity for the first modem to initialize on a first communication channel and a second communication channel to determine a first set of transmission parameters and a second set of transmission parameters, respectively;
(b) receiving, by the second modem, a first data packet from the first modem over the first upstream communication channel, the first data packet being sent from the first modem using the first set of transmission parameters;
(c) receiving, by the second modem, a second data packet from the first modem over the second communication channel when the second communication channel is more suitable for transmission of the second data packet when compared to the first communication channel, the second data packet being sent from the first modem using the second set of transmission parameters,
wherein the first communication channel and the second communication channel is a narrowband communication channel and a wideband communication channel, respectively, wherein the first data packet and the second data packet is a short data packet and a long data packet, respectively.

* * * * *

UNITED STATES PATENT AND TRADEMARK OFFICE
CERTIFICATE OF CORRECTION

| | | |
|---|---|---|
| PATENT NO. | : 8,094,676 B2 | Page 1 of 1 |
| APPLICATION NO. | : 12/710017 | |
| DATED | : January 10, 2012 | |
| INVENTOR(S) | : Thomas J. Kolze | |

It is certified that error appears in the above-identified patent and that said Letters Patent is hereby corrected as shown below:

On the Title Page, item (56) REFERENCES: please replace "SP-RFIv1.103-991105" with --SP-RFIv1.1-I03-991105--.

Column 19, line 15: please replace "each of the plurality of plurality of long data packet fragments" with --each of the plurality of long data packet fragments--.

Column 21, line 22: please replace "long data packet long into" with --long data packet fragments into--.

Column 21, line 53: please replace "The method of claim 8" with --The method of claim 18--.

Column 21, line 60: please replace "and transmit equalization information" with --transmit equalization information--.

Column 22, line 62: please replace "respectively, wherein" with --respectively, and wherein--.

Signed and Sealed this
Thirteenth Day of March, 2012

David J. Kappos
*Director of the United States Patent and Trademark Office*